United States Patent
Yamada et al.

(10) Patent No.: US 8,300,918 B2
(45) Date of Patent: Oct. 30, 2012

(54) DEFECT INSPECTION APPARATUS, DEFECT INSPECTION PROGRAM, RECORDING MEDIUM STORING DEFECT INSPECTION PROGRAM, FIGURE DRAWING APPARATUS AND FIGURE DRAWING SYSTEM

(75) Inventors: Ryo Yamada, Kyoto (JP); Itaru Furukawa, Kyoto (JP); Kiyoshi Kitamura, Kyoto (JP); Kazuhiro Nakai, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 1118 days.

(21) Appl. No.: 12/045,774

(22) Filed: Mar. 11, 2008

(65) Prior Publication Data
US 2008/0244308 A1    Oct. 2, 2008

(30) Foreign Application Priority Data

Mar. 30, 2007 (JP) ................. 2007-090093
Oct. 24, 2007 (JP) ................. 2007-276775

(51) Int. Cl.
*G06K 9/00* (2006.01)
(52) U.S. Cl. ...................................... 382/141
(58) Field of Classification Search .................. 382/145, 382/147, 149, 141; 716/52, 102, 112
See application file for complete search history.

(56) References Cited

U.S. PATENT DOCUMENTS

| 6,550,051 | B1 | 4/2003 | Takenouchi |
| 6,878,495 | B1 | 4/2005 | Rivers et al. |
| 2002/0026628 | A1 | 2/2002 | Matsuoka |
| 2004/0044981 | A1 | 3/2004 | Yoshimura et al. |
| 2005/0084779 | A1* | 4/2005 | Rivers et al. ............... 430/22 |
| 2005/0254699 | A1 | 11/2005 | Sano et al. |
| 2006/0018540 | A1 | 1/2006 | Imamura et al. |

FOREIGN PATENT DOCUMENTS

| CN | 1696671 A | 11/2005 |
| CN | 1725231 A | 1/2006 |
| CN | 1868074 A | 11/2006 |
| JP | 60-097482 | 5/1985 |
| JP | 07-219202 | 8/1995 |
| JP | 10-083452 | 3/1998 |

(Continued)

OTHER PUBLICATIONS

Untranslated Office Action issued by Chinese Patent Office on Jul. 2, 2010 in connection with corresponding Chinese application No. 200810086302.X.

(Continued)

*Primary Examiner* — Tarifur Chowdhury
*Assistant Examiner* — Jonathan Hansen
(74) *Attorney, Agent, or Firm* — Ostrolenk Faber LLP

(57) ABSTRACT

Input CAD data and run-length data obtained by performing a RIP process on the input CAD data are acquired. A predetermined conversion process is performed on at least one of the input CAD data and the run-length data to make the data formats of both data comparable and then both data are compared with each other to detect an area having a difference as a defect area in the run-length data. This provides a technique to detect a defect in the run-length data to be used for drawing of a figure before the execution of drawing with a simple structure.

18 Claims, 21 Drawing Sheets

FOREIGN PATENT DOCUMENTS

| | | |
|---|---|---|
| JP | 10-171093 | 6/1998 |
| JP | 2000-155408 | 6/2000 |
| JP | 2000-250960 | 9/2000 |
| JP | 2001-337041 | 12/2001 |
| JP | 2001-344302 | 12/2001 |
| JP | 2003-099770 | 4/2003 |
| JP | 2003-099771 | 4/2003 |
| JP | 2004-56068 | 2/2004 |
| JP | 2004-094044 | 3/2004 |
| JP | 2006-078421 | 3/2006 |
| JP | 2007-059429 | 3/2007 |
| JP | 2007-081326 | 3/2007 |
| KR | 10-0268777 | 7/2000 |
| KR | 10-2002-0016542 | 3/2002 |

OTHER PUBLICATIONS

Japanese translation of Chinese Office Action issued Jul. 2, 2010 in connection with corresponding Chinese application prepared by Japanese Associate.

English translation of Chinese Office Action based on Japanese translation prepared By Chinese attorney.

Untranslated Decision of Grant issued by Korean Patent Office on Nov. 30, 2009 in connection with corresponding Korean application No. 10-2008-0021639.

English translation of Taiwanese Office Action based on Japanese translation prepared by Japanese attorney.

English translation of Chinese Office Action issued Dec. 15, 2011 based on the Japanese translation.

* cited by examiner

F I G . 1 8
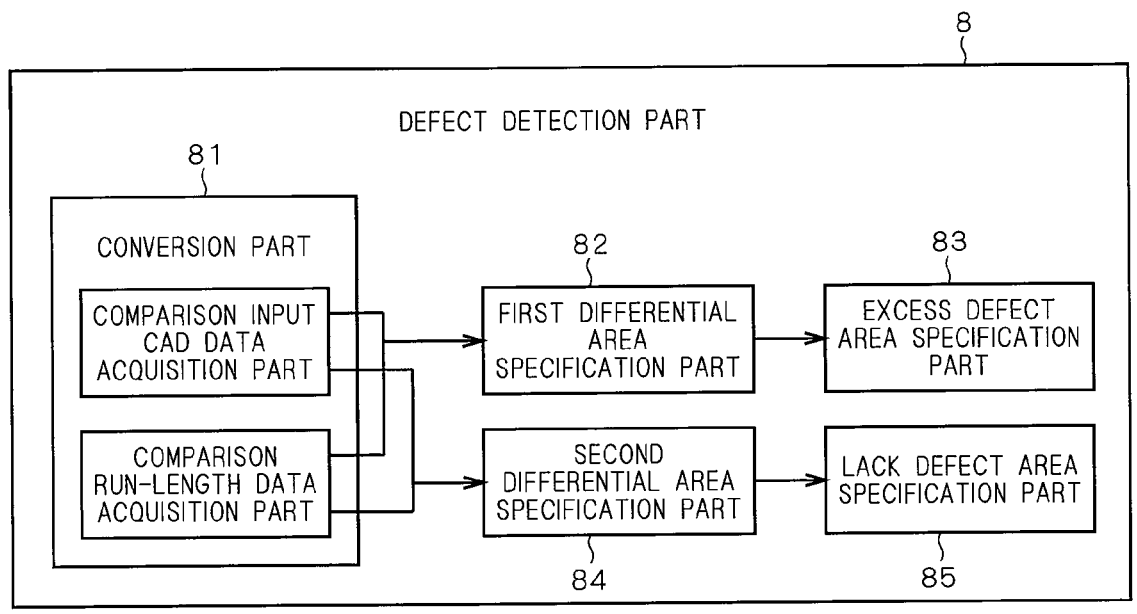

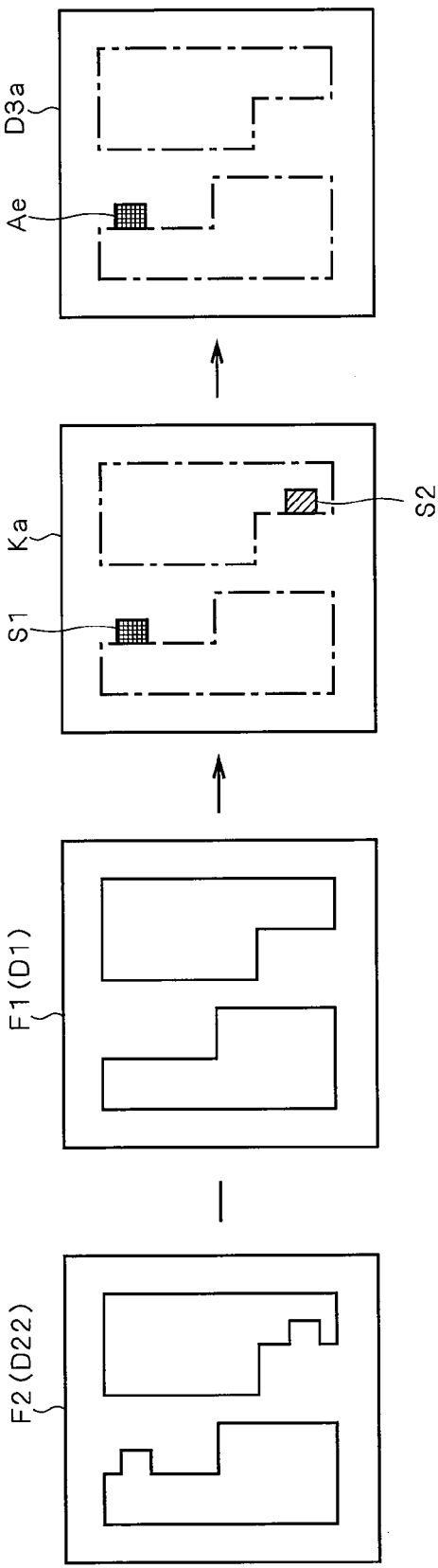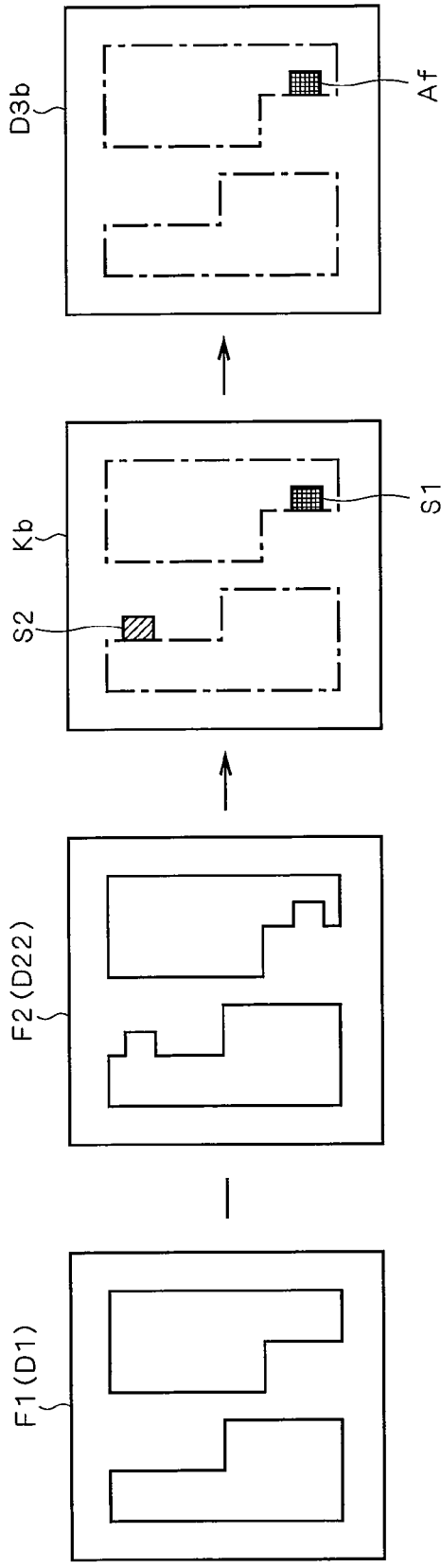

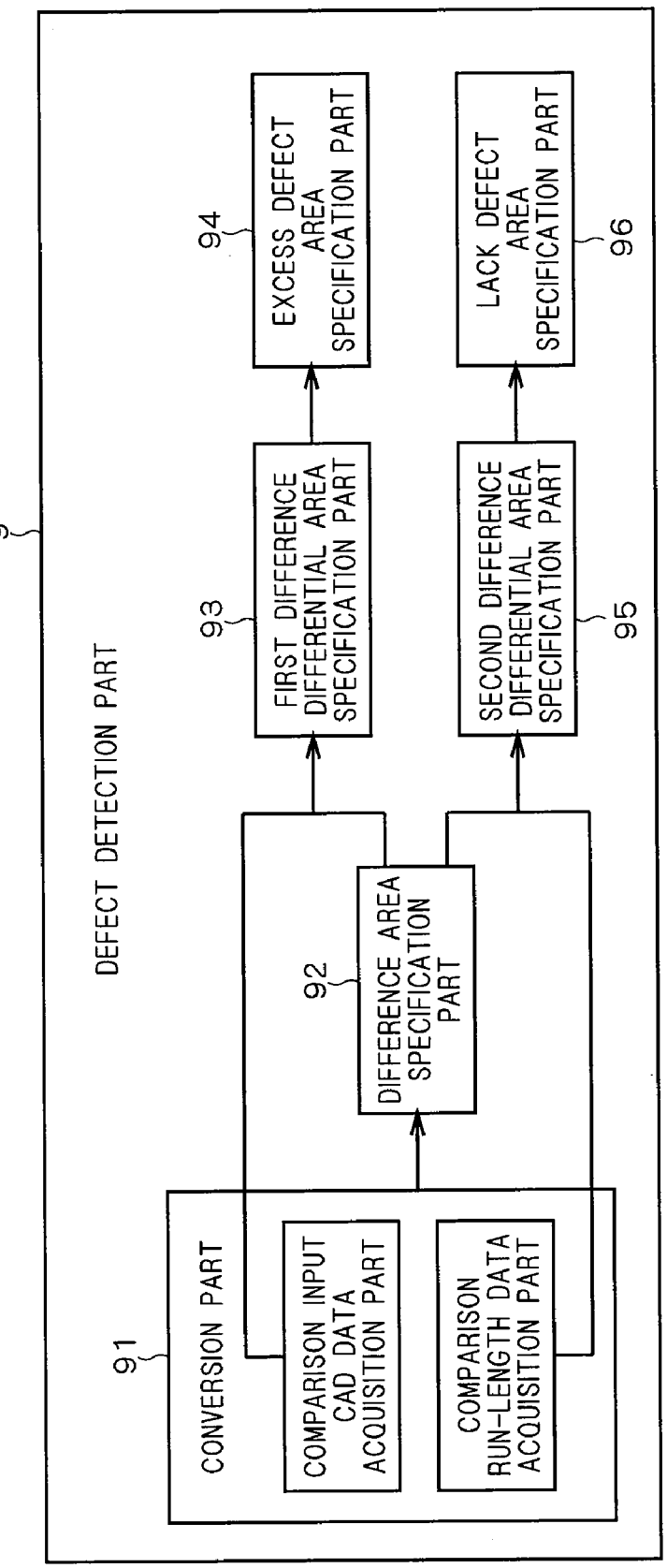
F I G . 2 0

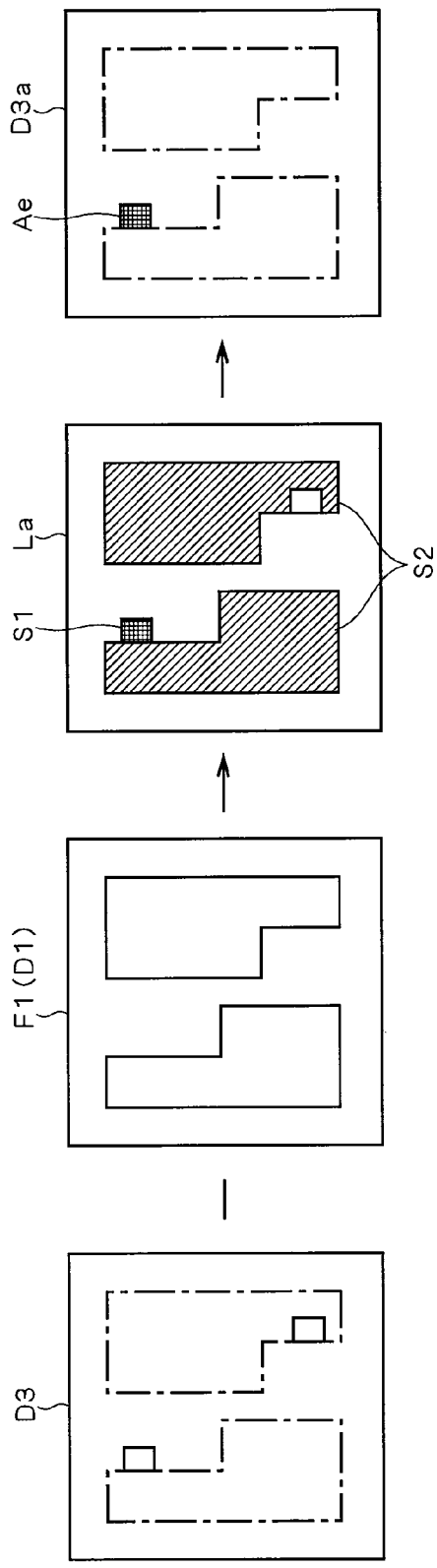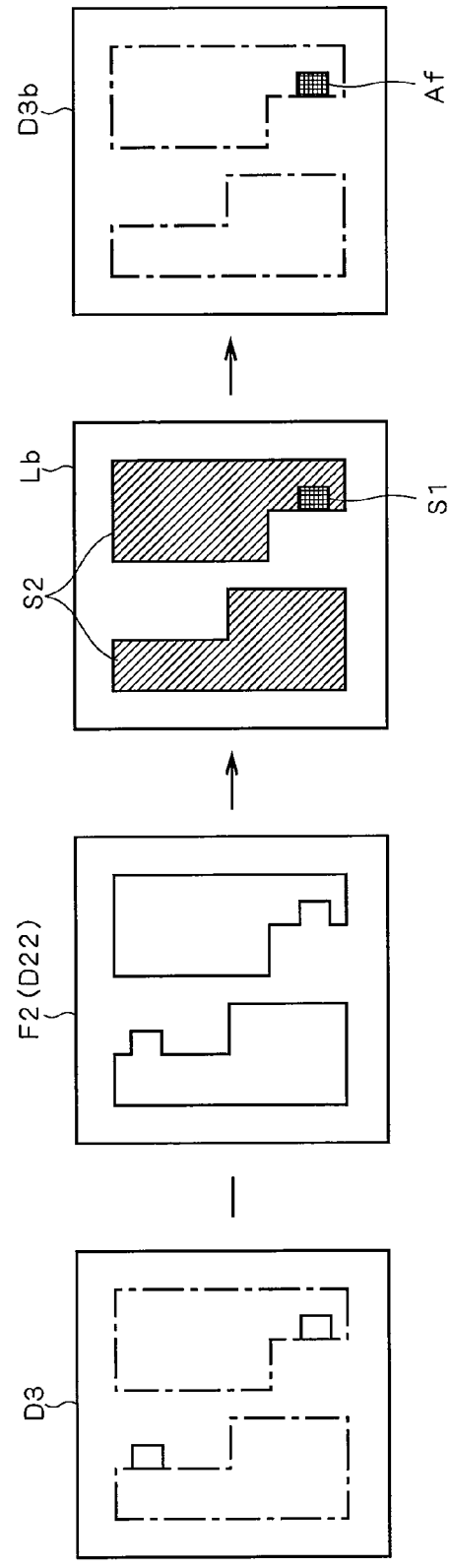

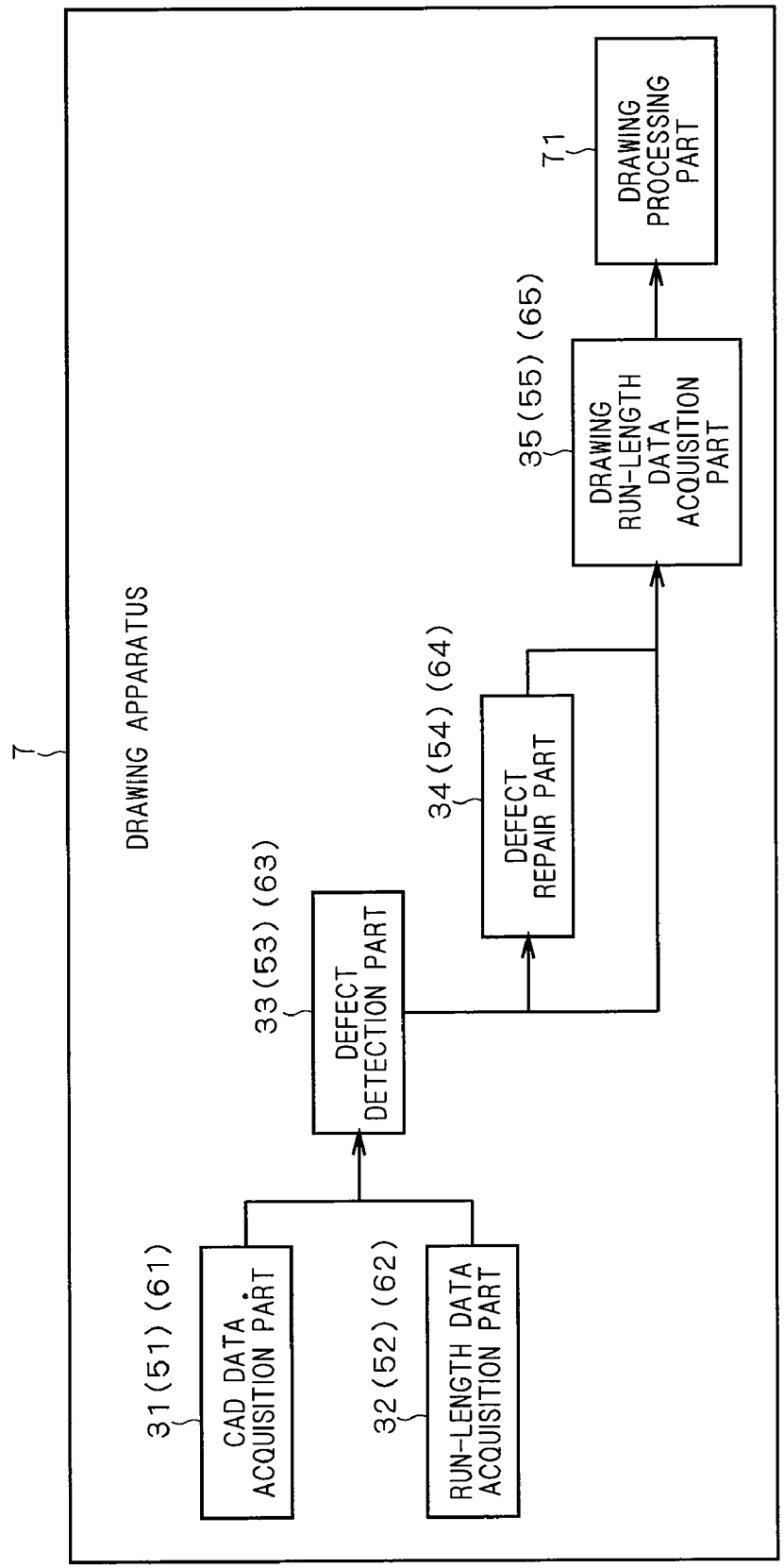
F I G . 2 2

DEFECT INSPECTION APPARATUS, DEFECT INSPECTION PROGRAM, RECORDING MEDIUM STORING DEFECT INSPECTION PROGRAM, FIGURE DRAWING APPARATUS AND FIGURE DRAWING SYSTEM

BACKGROUND OF THE INVENTION

1. Field of the Invention

The present invention relates to a technique to inspect a defect in run-length data which is acquired by performing a RIP process on input data describing a figure to be drawn and is to be used for drawing of the figure. More particularly, the present invention relates to a technique to inspect a defect in run-length data to be used for a process of drawing a circuit pattern of e.g., a semiconductor substrate, a glass substrate for liquid crystal display, a glass substrate for photomask, a glass substrate for plasma display, a substrate for optical disk or the like (hereinafter, referred to simply as "substrate") onto a resist directly from CAD data.

2. Description of the Background Art

With high integration and complication of semiconductor integrated circuits in recent, it is becoming indispensable to convert a business model of mass production of small varieties for e.g., DRAMs (Dynamic Random Access Memories) to that of small-quantity production of large varieties (flexible manufacturing system) for e.g., system LSIs. Further, circuit patterns of the system LSIs and the like have been miniaturized year after year and therefore the development cost has become enormous.

In pattern drawing (more specifically, pattern drawing (exposure) by photolithography) onto substrates, conventionally, a circuit pattern which is formed and compiled by a CAD system is drawn onto a film by laser to produce a photomask and the circuit pattern is transferred onto substrates by using the photomask. Photomasks which are thus produced, however, are very expensive since these are finely processed with high precision and disadvantageously not suitable for flexible manufacturing system in terms of cost.

Then, for reduction in cost for development of the system LSIs and the like, a pattern drawing system not using any photomask (specifically, a system for drawing circuit patterns onto resists directly from CAD data, which is hereinafter referred to as "direct drawing system") has been introduced.

An apparatus for drawing circuit patterns by direct drawing system (hereinafter, referred to as "direct drawing apparatus") performs drawing by interpreting run-length data (described by starting point positions and lengths of a plurality of line segments in a horizontal direction (or vertical direction) which is obtained by performing a RIP (Raster Image Processor) process on CAD data describing a circuit pattern to be drawn.

There is a possible case, however, where defects (in other words, differences from the description of the CAD data) are caused in the run-length data obtained by the RIP process by wrong conversion in the RIP process and the like. If the run-length data has a defect, correct drawing can not be performed. Therefore, in performing such drawing, a process to verify if correct drawing can be performed on the basis of run-length data without any defect should be performed.

In a pattern drawing system using photomask, a photomask is necessarily generated before execution of drawing. Therefore, by checking this photomask, it is possible to verify if correct drawing can be performed.

In the direct drawing system not using any photomask, however, it is impossible to inspect any defect in run-length data by using the photomask since drawing is performed without generation of the photomask. Then, in the direct drawing system, conventionally, drawing is performed onto substrates and the drawn circuit patterns are inspected. Defects are inspected, for example, by visually checking the circuit patterns on the substrates after development, or by checking images (picked-up images) obtained by imaging the circuit patterns on the substrates after development (see Japanese Patent Application Laid Open Gazette No. 2001-337041).

With this constitution, it is impossible to detect any defect in run-length data until drawing is once performed. In other words, even if the run-length data obtained by the RIP process has some defect, it is impossible to detect the defect before the execution of drawing. Therefore, a drawing process is performed on the basis of the defective run-length data and the substrates subjected to this drawing process go to waste.

In order to avoid producing such waste samples, a technique to detect any defect in run-length data before execution of drawing has been suggested. For example, suggested is a method where run-length data (for drawing) obtained by the RIP process from CAD data and run-length data (for verification) obtained from the CAD data by using an algorithm different from that of the RIP process are compared with each other, to detect any defect which occurs in the run-length data to be used for drawing (see Japanese Patent Application Laid Open Gazette No. 2004-56068).

The above constitution has an advantage that no sample goes to waste since it is possible to detect any defect in the run-length data before execution of drawing. This constitution, however, needs not only a functional part for performing the RIP process to acquire the run-length data to be actually used for drawing but also another functional part for performing a RIP process defined by an algorithm different from that of the above RIP process. In other words, a plurality of functional parts for the RIP processes are needed and a plurality of RIP processes should be performed for detection of defects. This increases the load for detection of defects and makes the processing time longer.

For these reasons, a technique to allow detection of defects in run-length data before execution of drawing with simple constitution has been sought.

SUMMARY OF THE INVENTION

The present invention is intended for a defect inspection apparatus for inspecting a defect in run-length data to be used for drawing of a figure. According to an aspect of the present invention, the defect inspection apparatus comprises an input data acquisition part for acquiring input data describing a figure to be drawn, a run-length data acquisition part for acquiring the run-length data by performing a RIP process on the input data, and a defect detection part for comparing the input data with the run-length data to detect a difference area as a defect area in the run-length data if it is found.

With such a constitution of the present invention, since any defect in the run-length data can be detected by comparing the data before and after the RIP process, i.e., the input data and the run-length data with each other, it is possible to detect any defect in the run-length data without performing a drawing process on the basis of the run-length data.

Preferably, the defect inspection apparatus further comprises a repair part for repairing the defect area to acquire repaired run-length data if the defect area is detected in the run-length data.

With such a constitution of the present invention, if a defect is detected in the run-length data, the defect is repaired, and it is therefore possible to acquire the run-length data without any defect.

Preferably, the defect detection part comprises a data format conversion part for performing a predetermined conversion process on at least one of the input data and the run-length data to make the data formats of both data comparable.

Preferably, the data format conversion part comprises a figuring part for performing a figuring process on the run-length data to acquire figured run-length data which is obtained by figuring the run-length data, and the defect detection part comprises a difference area specification part for acquiring difference area data specifying the difference area by computing an exclusive OR of the figured run-length data and the input data.

Preferably, the defect detection part comprises an excess defect area specification part for specifying an excess defect area in which run data is generated in the run-length data though no corresponding area exists in the input data by computing a logical product of the difference area data and the figured run-length data.

Preferably, the defect inspection apparatus further comprises an excess defect repair part for deleting run data generated in the excess defect area in the run-length data if the excess defect area is specified.

Preferably, the defect detection part comprises a lack defect area specification part for specifying a lack defect area in which no run data is generated in the run-length data though an area exists in the input data by computing a logical product of the difference area data and the input data.

Preferably, the defect inspection apparatus comprises a lack defect repair part for generating new run data in the lack defect area in the run-length data if the lack defect area is specified.

Preferably, the defect detection part comprises a first difference differential area acquisition part for acquiring first difference differential area data by subtracting a figure area defined by the input data from a figure area defined by the difference area data, and an excess defect area specification part for specifying an excess defect area in which run data is generated in the run-length data though no corresponding area exists in the input data by extracting an area of positive value in the first difference differential area data.

Preferably, the defect detection part comprises a second difference differential area acquisition part for acquiring second difference differential area data by subtracting a figure area defined by the figured run-length data from a figure area defined by the difference area data, and a lack defect area specification part for specifying a lack defect area in which no run data is generated in the run-length data though an area exists in the input data by extracting an area of positive value in the second difference differential area data.

Preferably, the data format conversion part comprises a figuring part for performing a figuring process on the run-length data to acquire figured run-length data which is obtained by figuring the run-length data, and the defect detection part comprises a first differential area acquisition part for acquiring first differential area data by subtracting a figure area defined by the input data from a figure area defined by the figured run-length data, and an excess defect area specification part for specifying an excess defect area in which run data is generated in the run-length data though no corresponding area exists in the input data by extracting an area of positive value in the first differential area data.

Preferably, the data format conversion part comprises a figuring part for performing a figuring process on the run-length data to acquire figured run-length data which is obtained by figuring the run-length data, and the defect detection part comprises a second differential area acquisition part for acquiring second differential area data by subtracting a figure area defined by the figured run-length data from a figure area defined by the input data, and a lack defect area specification part for specifying a lack defect area in which no run data is generated in the run-length data though an area exists in the input data by extracting an area of positive value in the second differential area data.

Preferably, the data format conversion part comprises a run-length data imaging part for performing a first imaging process on the run-length data to acquire imaged run-length data which is obtained by imaging the run-length data, and an input data imaging part for performing a second imaging process on the input data to acquire imaged input data which is obtained by imaging the input data, and the defect detection part comprises a difference area specification part for specifying the difference area by comparing the imaged run-length data with the imaged input data by pixels.

Preferably, the difference area specification part comprises a pixel comparison excess defect area specification part for comparing the imaged run-length data with the imaged input data by pixels to specify an area in which a pixel exists only in the imaged run-length data as an excess defect area in which run data is generated in the run-length data though no corresponding area exists in the input data.

Preferably, the difference area specification part comprises a pixel comparison lack defect area specification part for comparing the imaged run-length data with the imaged input data by pixels to specify an area in which a pixel exists only in the imaged input data as a lack defect area in which no run data is generated in the run-length data though an area exists in the input data.

Preferably, the data format conversion part comprises an input data coordinating part for performing a coordinating process on the input data to acquire coordinated input data described by a set of respective coordinate values of one or more figures included in the input data, and the defect detection part comprises a difference area specification part for specifying an excess defect area in which run data is generated in the run-length data though no corresponding area exists in the input data and a lack defect area in which no run data is generated in the run-length data though an area exists in the input data by comparing positions of starting points and end points of a plurality of runs included in the run-length data with a predetermined coordinate value among a plurality of coordinate values included in the coordinated input data.

Preferably, the input data is CAD data of a pattern to be drawn onto a substrate, and the run-length data is used for drawing of the pattern onto the substrate.

With such a constitution of the present invention, any defect in the run-length data can be detected before drawing a pattern onto substrates on the basis of the run-length data. Therefore, it is possible to avoid a situation where a drawing process is performed on substrates on the basis of defective run-length data to produce waste samples.

The present invention is further intended for a computer-readable recording medium for storing a program which is stored in a computer and executed by the computer to cause the computer to function as a defect inspection apparatus for inspecting a defect in run-length data to be used for drawing of a figure.

The present invention is still intended for a figure drawing apparatus for drawing a figure onto an output medium on the basis of run-length data. According to an aspect of the present invention, the figure drawing apparatus comprises an input data acquisition part for acquiring input data describing a figure to be drawn, a run-length data acquisition part for acquiring the run-length data by performing a RIP process on the input data, a defect detection part for comparing the input data with the run-length data to detect a difference area as a defect area in the run-length data if it is found, a repair part for repairing the defect area to acquire repaired run-length data if the defect area is detected in the run-length data, a drawing run-length data acquisition part for acquiring the repaired run-length data as drawing run-length data if the defect area is detected in the run-length data and acquiring the run-length data as drawing run-length data if the defect area is not detected in the run-length data, and a drawing part for drawing a figure onto the output medium on the basis of the drawing run-length data.

With such a constitution of the present invention, if a defect is detected in the run-length data, a process of drawing a figure is performed on the basis of the repaired run-length data. Therefore, it is possible to draw a correct figure on the basis of the run-length data with its defect repaired.

The present invention is yet further intended for a figure drawing system for drawing a figure onto an output medium on the basis of run-length data. According to an aspect of the present invention, the figure drawing system comprises a defect inspection apparatus for inspecting a defect in the run-length data and a drawing apparatus for acquiring drawing run-length data from the defect inspection apparatus and drawing a figure onto the output medium on the basis of the drawing run-length data, and in the figure drawing system of the present invention, the defect inspection apparatus comprises an input data acquisition part for acquiring input data describing a figure to be drawn, a run-length data acquisition part for acquiring the run-length data by performing a RIP process on the input data, a defect detection part for comparing the input data with the run-length data to detect a difference area as a defect area in the run-length data if it is found, a repair part for repairing the defect area to acquire repaired run-length data if the defect area is detected in the run-length data, a drawing run-length data acquisition part for acquiring the repaired run-length data as drawing run-length data if the defect area is detected in the run-length data and acquiring the run-length data as drawing run-length data if the defect area is not detected in the run-length data, and a drawing run-length data transmitting part for transmitting the drawing run-length data to the drawing apparatus.

Therefore, it is an object of the present invention to provide a technique to detect a defect in run-length data to be used for drawing of a figure before execution of drawing with a simple structure.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a view showing a functional structure of a defect detection part in accordance with a first variation;

FIGS. 19A and 19B are schematic diagrams illustrating various data acquired in a defect detection process and the correlation thereof in accordance with the first variation;

FIG. 20 is a view showing a functional structure of a defect detection part in accordance with a second variation;

FIGS. 21A and 21B are schematic diagrams illustrating various data acquired in a defect detection process and the correlation thereof in accordance with the second variation; and FIG. 22 is a schematic diagram showing a structure of a drawing apparatus.

DESCRIPTION OF THE PREFERRED EMBODIMENTS

The First Preferred Embodiment

1. Constitution and Structure

1a. Overall Structure of Figure Drawing System

Figure 1:
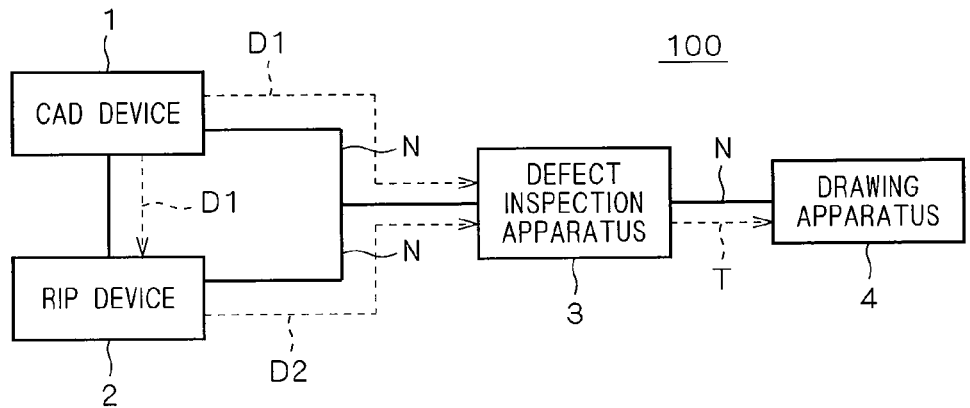
FIG. 1 is a view showing an overall structure of a figure drawing system in accordance with a first preferred embodiment of the present invention.

Herein, discussion will be made on a figure drawing system 100 in accordance with the first preferred embodiment of the present invention with reference to FIG. 1. FIG. 1 is a view showing an overall structure of the figure drawing system 100.

The figure drawing system 100 comprises a CAD device 1, a RIP device 2, a defect inspection apparatus 3 and a drawing apparatus 4. These devices and apparatuses 1 to 4 are connected with one another via a network N such as LAN.

The CAD device 1 is a device to generate and compile data describing figures to be drawn, and it outputs the data as CAD data which are vector data. The CAD data is represented by a data format having a cell hierarchy, which is termed a stream format (e.g., GDS II). Each cell hierarchy holds information on one or more figures (e.g., information on positions and shapes of the figures, and specifically, vertex position coordinates and the like) and cell reference information. Hereinafter, the CAD data outputted from the CAD device 1 is referred to as "input CAD data D1".

Figure 4:
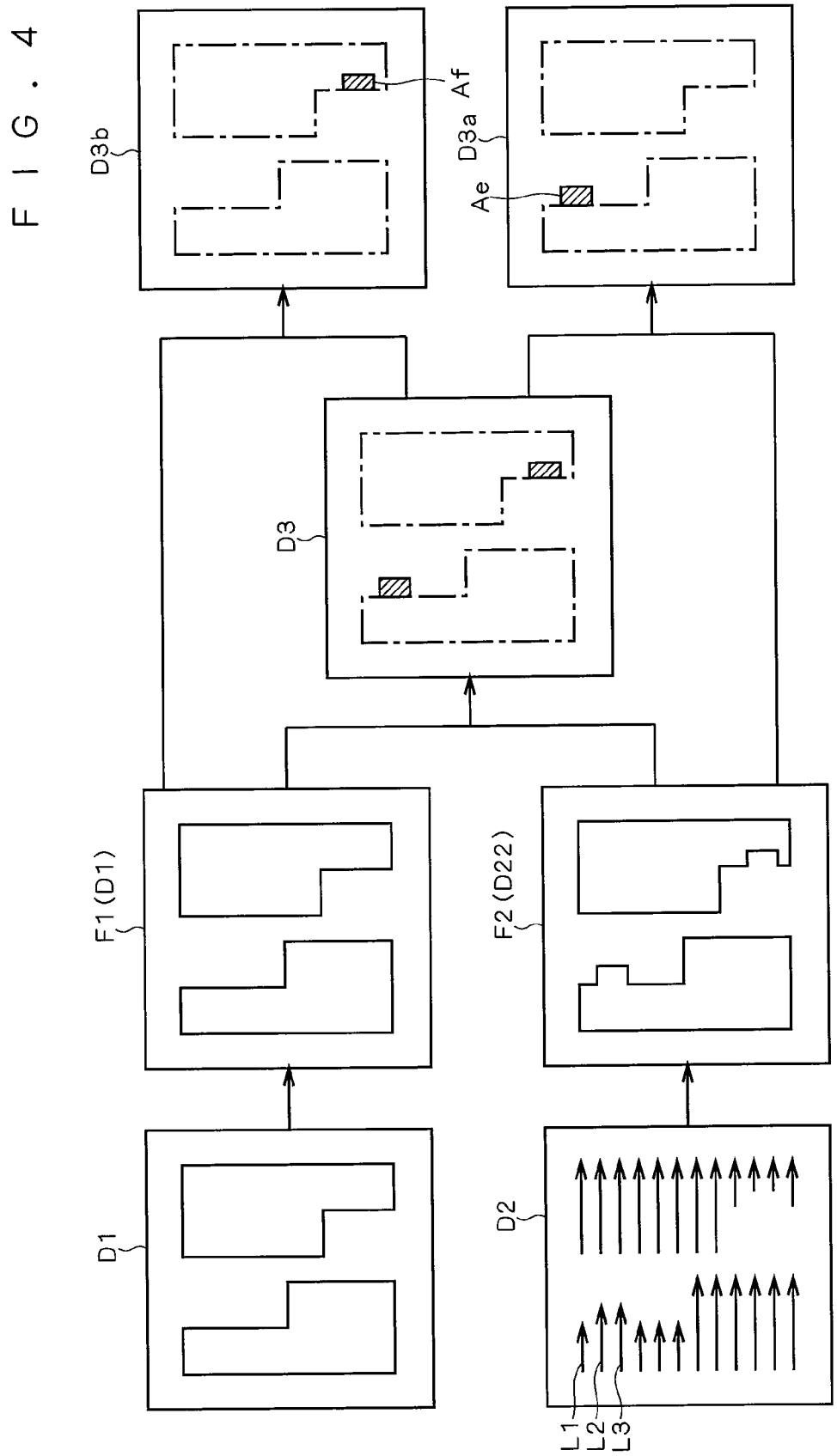
FIG. 4 is a schematic diagram showing various data acquired in a defect detection process and the correlation thereof.

The RIP device 2 acquires the input CAD data D1 from the CAD device 1, and then it performs a RIP development of the acquired input CAD data D1 to convert the data into run-length data and outputs the run-length data. More specifically, the RIP device 2 converts the input CAD data D1 which is vector data into raster image data (specifically, data in which a lot of line data (in which binary image data forming a plurality of pixels are arranged in the first direction) are arranged in the second direction orthogonal to the first direction). Further, the RIP device 2 performs a run-length coding process on the raster image data to output the compressed run-length data. More specifically, it sequentially performs the run-length coding process on the bitmap data by the line data from the first line to the last line in the second direction to convert the data into the compressed run-length data. The obtained run-length data becomes data in which a figure area in the input CAD data D1 is described by the starting point positions and lengths of a plurality of line segments (runs Li (i=1, 2 . . . )) in the horizontal direction as shown in FIG. 4. Hereinafter, the run-length data outputted from the RIP device 2 is referred to as "run-length data D2".

The defect inspection apparatus 3 inspects any defect in the run-length data D2 to be used for drawing. Specifically, the defect inspection apparatus 3 acquires the input CAD data D1 from the CAD device 1 and the run-length data D2 from the RIP device 2 and inspects any defect in the run-length data D2 on the basis of these two acquired data. Further, the defect inspection apparatus 3 transmits the run-length data to be used for drawing (drawing run-length data T) to the drawing apparatus 4. Specifically, if some defect is found in the run-length data D2, the defect inspection apparatus 3 transmits data in which the defect is repaired (repaired run-length data D4) (see FIG. 6) to the drawing apparatus 4 as drawing run-length data T. If no defect is found in the run-length data D2, the defect inspection apparatus 3 transmits the run-length data D2 to the drawing apparatus 4 as drawing run-length data T without any change. Specific constitution of the defect inspection apparatus 3 will be discussed in detail later.

The drawing apparatus 4 is an apparatus for drawing a figure onto an output medium. Specifically, the drawing apparatus 4 acquires the drawing run-length data T from the defect inspection apparatus 3 and performs drawing of a figure on the basis of the acquired drawing run-length data T. More specifically, the drawing apparatus 4 develops the drawing run-length data T into bitmap data and records a two-dimensional image into the output medium on the basis of the bitmap data.

In this preferred embodiment, taken is a case where the CAD device 1 generates drawing data of a circuit pattern for an LSI or the like to be recorded on a substrate by exposure and outputs the data as the input CAD data D1. Further, in this case, the drawing apparatus 4 is an apparatus for drawing (exposing) the circuit pattern generated by the CAD device 1 directly onto the substrate.

1b. Constitution of Defect Inspection Apparatus 1b-1. Hardware Structure

Figure 2:
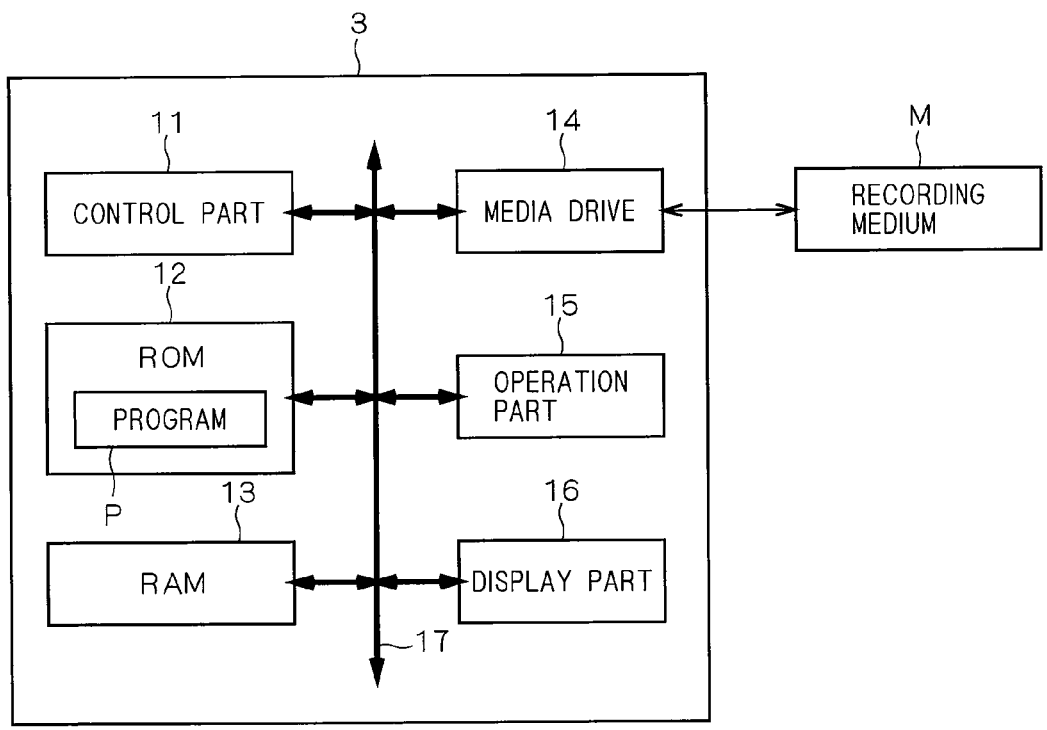
FIG. 2 is a schematic view showing a structure of a defect inspection apparatus.

Hereinafter, a hardware structure of the defect inspection apparatus 3 will be discussed with reference to FIG. 2. FIG. 2 is a schematic view showing a hardware structure of the defect inspection apparatus 3.

The defect inspection apparatus 3 has a structure in which a control part 11, a ROM 12, a RAM 13, a media drive 14, an operation part 15 and a display part 16 are electrically connected with one another through a bus line 17.

The control part 11 is a CPU. The control part 11 controls the above hardware parts on the basis of a program P stored in the ROM 12 (or a program P read by the media drive 14), to implement the function of the defect inspection apparatus 3.

The ROM 12 is a read-only memory device in which the program P and data needed to control the defect inspection apparatus 3 are stored in advance.

The RAM 13 is a readable and writable memory device and temporarily stores data which is generated in the operation performed by the control part 11, and the like. The RAM 13 is an SRAM, a flash memory or the like.

The media drive 14 is a functional part for reading information stored in a recording medium M (specifically, a portable recording medium such as a CD-ROM, a DVD (Digital Versatile Disk), a flexible disk and the like).

The operation part 15 is an input device including a keyboard and a mouse and receives user's manipulations, i.e., inputs of commands and various data. The user's manipulations received by the operation part 15 are inputted to the control part 11 as signals.

The display part 16 comprises a monitor and the like and displays various data, the operation status of the defect inspection apparatus 3 and the like.

1b-2. Functional Structure

Figure 3:
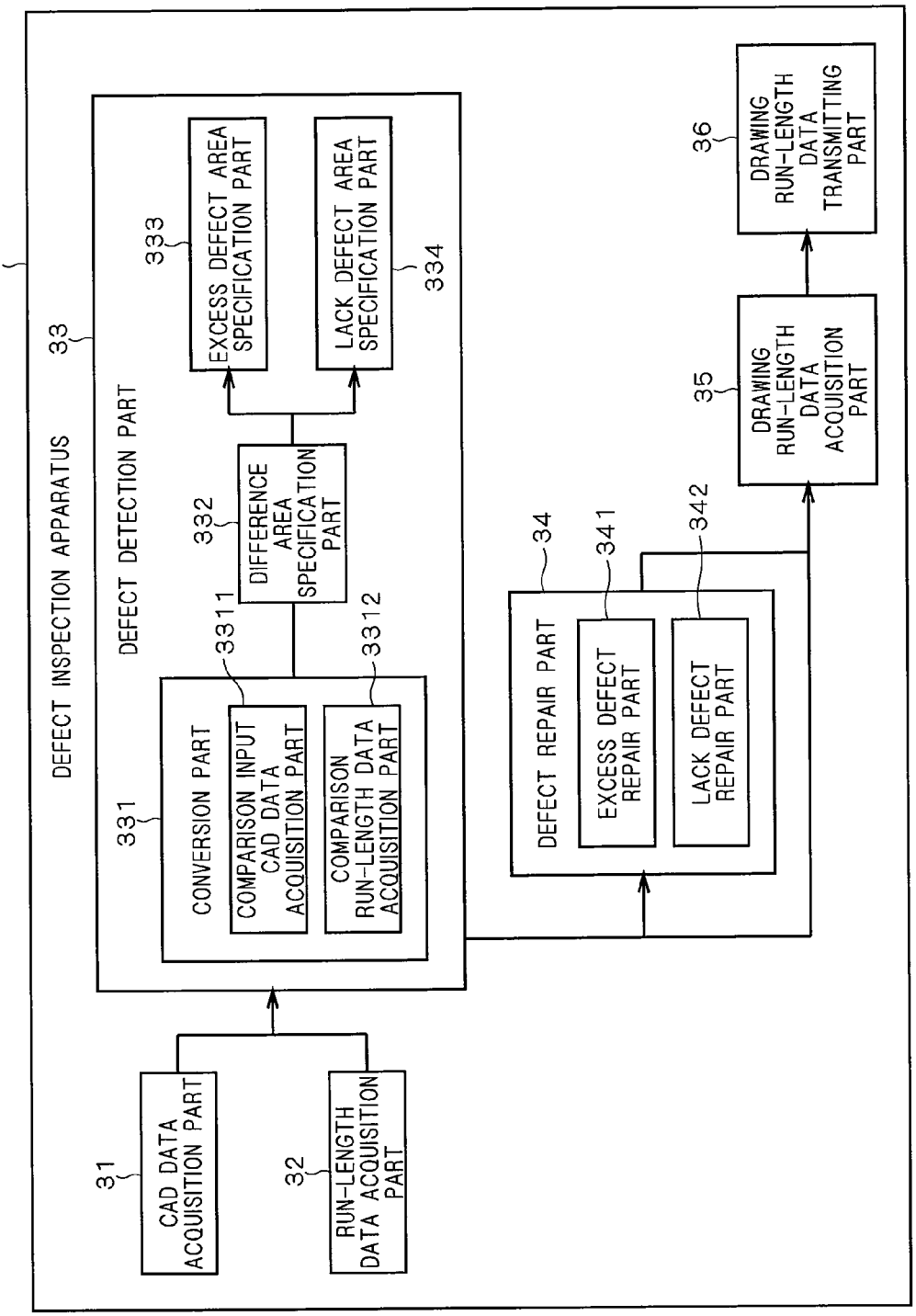
FIG. 3 is a schematic view showing a functional structure of the defect inspection apparatus.

Hereinafter, a functional structure of the defect inspection apparatus 3 will be discussed with reference to FIGS. 3 and 4. FIG. 3 is a schematic view showing a functional structure of the defect inspection apparatus 3. FIG. 4 is a schematic diagram showing various data acquired in a defect detection process performed by the defect inspection apparatus 3 and the correlation thereof.

The defect inspection apparatus 3 comprises a CAD data acquisition part 31, a run-length data acquisition part 32, a defect detection part 33, a defect repair part 34, a drawing run-length data acquisition part 35 and a drawing run-length data transmitting part 36. The functions of these constitutional parts are implemented by reading the program P stored in the ROM 12 and the like in advance or the program P recorded in the recording medium M and executing the program P by the control part 11.

The CAD data acquisition part 31 acquires the input CAD data D1 describing a figure to be drawn (which is data before performing a RIP development to obtain the run-length data D2 to be inspected) from the CAD device 1 through the network N.

The run-length data acquisition part 32 acquires the run-length data D2 to be used for drawing of a figure (which is data obtained by the RIP development of the input CAD data D1 describing the figure to be drawn) from the RIP device 2 through the network N.

The defect detection part 33 detects any defect in the run-length data D2. More specifically, the defect detection part 33 compares the input CAD data D1 with the run-length data D2 and if a difference area is found, it detects the difference area as a defect area in the run-length data D2. The defect detection part 33 comprises a conversion part 331, a difference area specification part 332, an excess defect area specification part 333 and a lack defect area specification part 334.

The conversion part 331 performs a predetermined conversion process on at least one of the input CAD data D1 and the run-length data D2 which are described in different formats, to acquire comparison CAD data F1 and comparison run-length data F2 whose data formats are made comparable (see FIG. 4). The conversion part 331 comprises a comparison input CAD data acquisition part 3311 and a comparison run-length data acquisition part 3312.

The comparison input CAD data acquisition part 3311 acquires the input CAD data D1 acquired by the CAD data acquisition part 31 as the comparison CAD data F1 without any change (see FIG. 4).

The comparison run-length data acquisition part 3312 performs a figuring process on the run-length data D2 acquired by the run-length data acquisition part 32 to acquire figured run-length data D22 obtained by performing the process as the comparison run-length data F2 (see FIG. 4).

Figure 5:
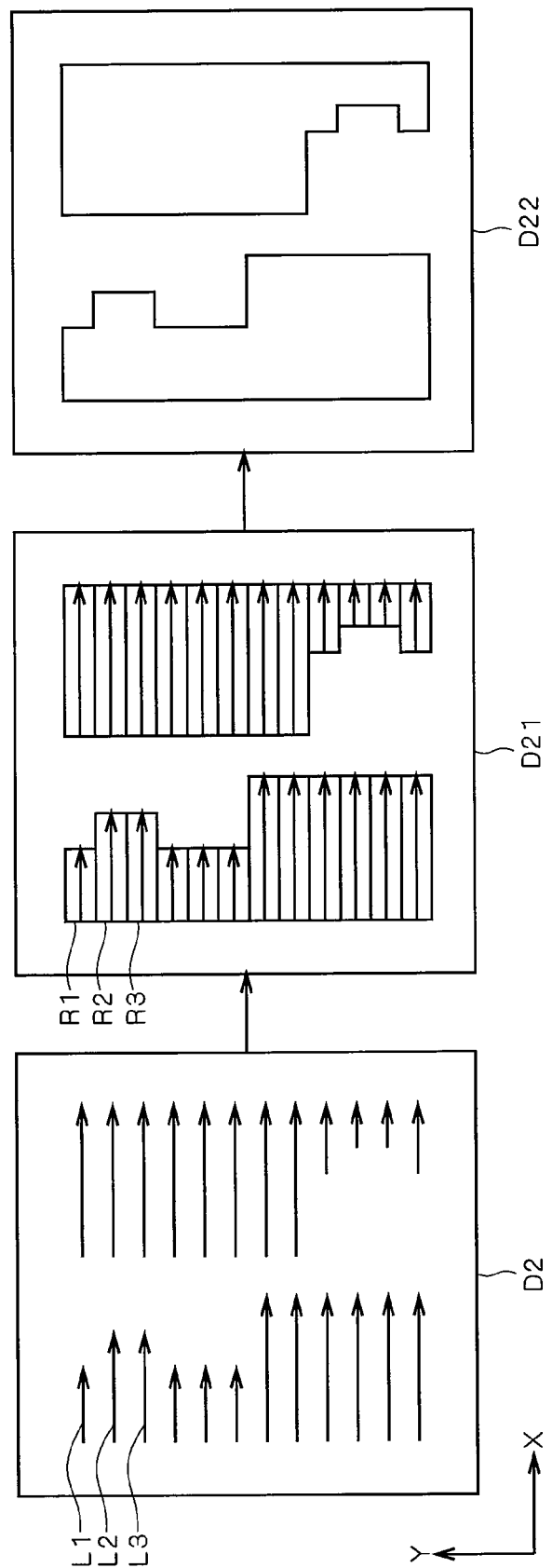
FIG. 5 is a schematic diagram illustrating a figuring process.

The "figuring process" refers to a process to convert the run-length data D2 described by a plurality of runs Li (i=1, 2 . . . ) into a data format described by a figure. The figuring process will be discussed with reference to FIG. 5. FIG. 5 is a schematic diagram illustrating the figuring process.

In the figuring process, first, each of a plurality of runs Li constituting the run-length data D2 is converted into a figure of rectangle. Specifically, each run Li is converted into a rectangle Ri (i=1, 2 . . . ) in which the length of X direction is equal to that of the line segment of the run Li and the length of Y direction is equal to the distance between the adjacent runs Li in the Y direction. By this process, the run-length data D2 is converted from data described by a plurality of runs Li into data D21 described by a plurality of rectangles Ri.

Subsequently, a plurality of rectangles Ri are merged (by computing a logical sum (OR) of a plurality of rectangles Ri) to extract a merge area of the rectangles Ri. With this operation, an area described by the run-length data D2 is converted into a figure to acquire the figured run-length data D22.

Referring to FIG. 3 again, the difference area specification part 332 compares the comparison CAD data F1 with the comparison run-length data F2 to detect any difference of these data. More specifically, the difference area specification part 332 obtains an exclusive OR (XOR) of the comparison CAD data F1 (i.e., the input CAD data D1 in this case) and the comparison run-length data F2 (i.e., the figured run-length data D22 in this case) by computation to acquire difference area data D3 specifying a difference area between these data (see FIG. 4). If there is a difference area between these data, the difference area is detected as a defect area of the run-length data D2.

The excess defect area specification part 333 obtains a logical product (AND) of the difference area data D3 and the comparison run-length data F2 (i.e., figured run-length data D22) by computation to acquire excess defect area data D3a specifying an "excess defect area Ae" (see FIG. 4). The "excess defect area Ae" refers to an excess data area which is generated by the RIP process in an area where any data should not be originally generated (in other words, refers to an area in which run data is generated in the run-length data D2 though no corresponding area exists in the input CAD data D1). Specifically, the excess defect area specification part 333 specifies the excess defect area Ae by extracting only the area existing in the figured run-length data D22 among the areas defined by the difference area data D3 (i.e., the difference areas between the input CAD data D1 and the run-length data D2).

The lack defect area specification part 334 obtains a logical product (AND) of the difference area data D3 and the comparison CAD data F1 (i.e., input CAD data D1) by computation to acquire lack defect area data D3b specifying a "lack defect area Af" (see FIG. 4). The "lack defect area Af" refers to a data area which is not generated by the RIP process in an area where the data should be originally generated (in other words, refers to an area in which no run data is generated in the run-length data D2 though an area exists in the input CAD data D1). Specifically, the lack defect area specification part 334 specifies the lack defect area Ae by extracting only the area existing in the input CAD data D1 among the areas defined by the difference area data D3.

If the defect detection part 33 detects some defect in the run-length data D2, the defect repair part 34 performs a defect repair process on the run-length data D2 to acquire repaired run-length data D4. The defect repair part 34 comprises an excess defect repair part 341 and a lack defect repair part 342.

Figure 6:
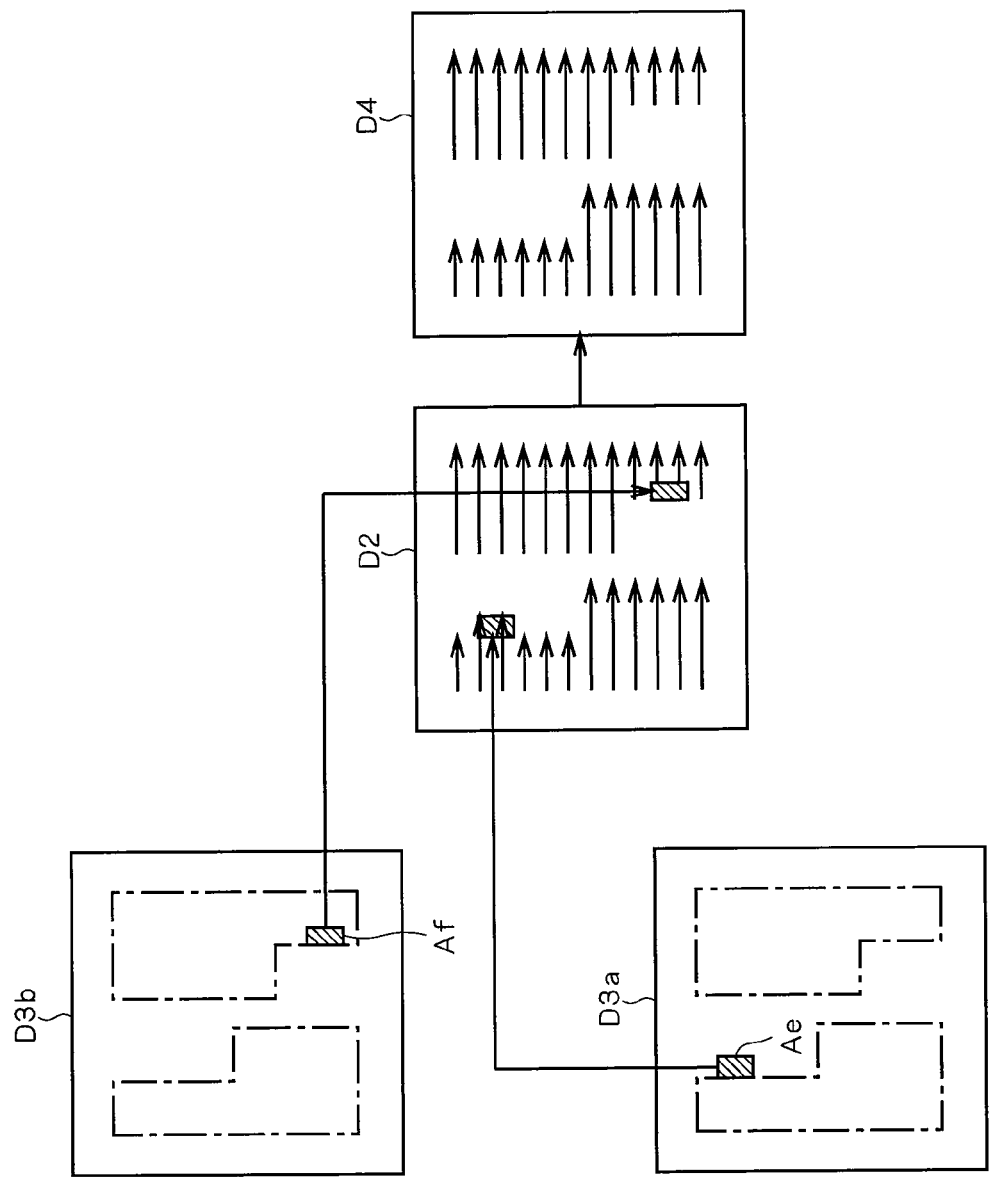
FIG. 6 is a schematic diagram illustrating a defect repair process.

If an excess defect area Ae is detected, the excess defect repair part 341 repairs the excess defect area Ae. More specifically, as shown in FIG. 6, the excess defect repair part 341 specifies the excess defect area Ae in the run-length data D2 on the basis of the excess defect area data D3a acquired by the excess defect area specification part 333 (for example, specifies the defect area with vertex coordinate values of the defect area) and performs a process of deleting the run data existing in the defect area. With this operation, the excess defect of the run-length data D2 is repaired.

If a lack defect area Af is detected, the lack defect repair part 342 repairs the lack defect area Af. More specifically, as shown in FIG. 6, the lack defect repair part 342 specifies the lack defect area Af in the run-length data D2 on the basis of the lack defect area data D3b acquired by the lack defect area specification part 334 and performs the RIP process on this area again to generate new run data. Further, if run data exists near the new run data, the new run data and the near run data are united. With this operation, the lack defect of the run-length data D2 is repaired to acquire the repaired run-length data D4.

The drawing run-length data acquisition part 35 acquires drawing run-length data T which is run-length data to be used for drawing. More specifically, if the defect detection part 33 does not detect any defect in the run-length data D2 subjected to the inspection, the drawing run-length data acquisition part 35 acquires the run-length data D2 as the drawing run-length data T and if the defect detection part 33 detects some defect in the run-length data D2 subjected to the inspection, the drawing run-length data acquisition part 35 acquires the repaired run-length data D4 which is acquired by the defect repair part 34, as the drawing run-length data T.

The drawing run-length data transmitting part 36 transmits the drawing run-length data T acquired by the drawing run-length data acquisition part 35 to the drawing apparatus 4. The drawing apparatus 4 performs drawing on the basis of the drawing run-length data T received from the drawing run-length data transmitting part 36.

2. Process Operation

2a. Operation of Figure Drawing System

Figure 7:
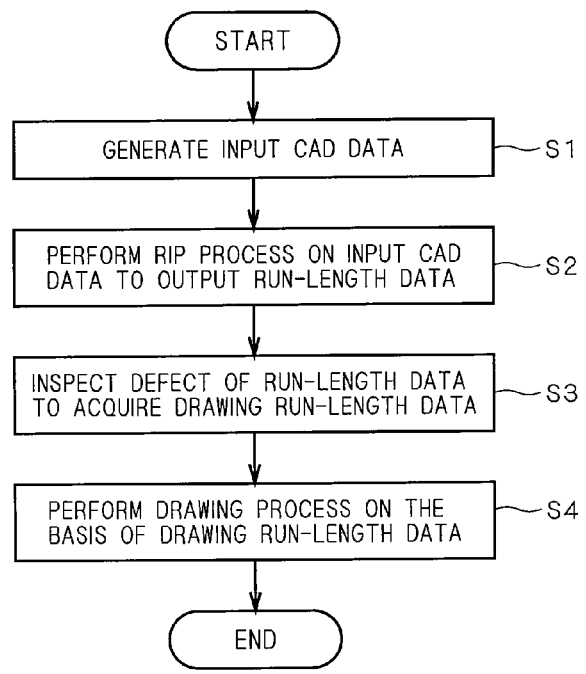
FIG. 7 is a flowchart showing an operation flow from acquisition of input CAD data to drawing of a figure.

Hereinafter, an operation performed by the figure drawing system 100 will be discussed with reference to FIG. 7. FIG. 7 is a flowchart showing an operation flow from acquisition of the input CAD data D1 to drawing of a figure.

First, the CAD device 1 generates drawing data of a circuit pattern to be recorded by exposure onto substrates and transmits the data as input CAD data D1 to the RIP device 2 (Step S1).

Subsequently, the RIP device 2 which acquires the input CAD data D1 from the CAD device 1 performs a RIP development on the acquired input CAD data D1 and outputs run-length data D2 (Step S2).

Next, the defect inspection apparatus 3 acquires the run-length data D2 outputted from the RIP device 2 in Step S2, inspects any defect in the run-length data D2 to acquire the drawing run-length data T and outputs the drawing run-length data T to the drawing apparatus 4 (Step S3). Specific operation flow of Step S3 will be discussed in detail later.

Subsequently, the drawing apparatus 4 which acquires the drawing run-length data T from the defect inspection apparatus 3 performs a drawing process on the basis of the acquired drawing run-length data T (Step S4). Specifically, the drawing apparatus 4 exposes the circuit pattern of two-dimensional image onto substrates.

The above is a series of operations in the drawing process performed by the figure drawing system 100. Next, a process step (Step S3) executed by the defect inspection apparatus 3 will be discussed.

2b. Operation of Defect Inspection Apparatus 3

Figure 8:
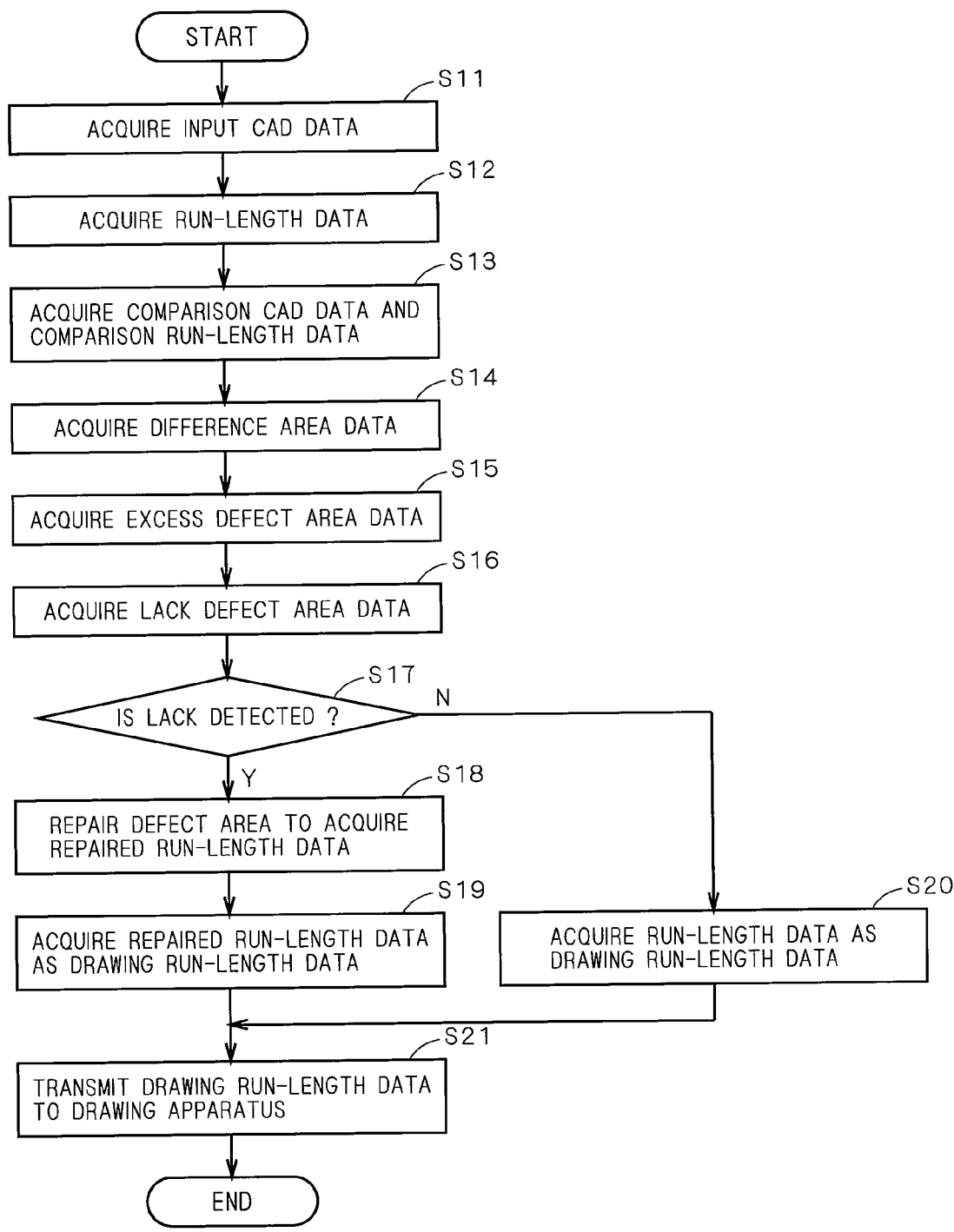
FIG. 8 is a flowchart showing an operation flow of a defect inspection process and a defect repair process.

Specific discussion on a process performed by the defect inspection apparatus 3 (i.e., a defect inspection process and a defect repair process) will be made with reference to FIG. 8. FIG. 8 is a flowchart showing an operation flow of the defect inspection process and the defect repair process performed by the defect inspection apparatus 3.

First, the CAD data acquisition part 31 acquires the input CAD data D1 from the CAD device 1 (Step S11). The run-length data acquisition part 32 acquires the run-length data D2 from the RIP device 2 (Step S12).

Subsequently, the defect detection part 33 detects any defect in the run-length data D2 acquired in Step S12 (Steps S13 to S16).

Specifically, first, the conversion part 331 acquires the comparison CAD data F1 and the comparison run-length data F2 whose data formats are made comparable (Step S13). More specifically, the comparison input CAD data acquisition part 3311 acquires the input CAD data D1 (i.e., data acquired by the CAD data acquisition part 31 in Step S11) as the comparison CAD data F1. The comparison run-length data acquisition part 3312 performs a figuring process on the run-length data D2 (i.e., data acquired by the run-length data acquisition part 32 in Step S12) to acquire the figured run-length data D22 obtained by performing this process as the comparison run-length data F2.

Subsequently, the difference area specification part 332 obtains an exclusive OR of the comparison CAD data F1 and the comparison run-length data F2 by computation to acquire the difference area data D3 specifying the difference area between these data (Step S14).

Next, the excess defect area specification part 333 obtains a logical product (AND) of the difference area data D3 acquired in Step S14 and the comparison run-length data F2 acquired in Step S13 (i.e., the figured run-length data D22) by computation to acquire the excess defect area data D3a specifying the excess defect area Ae (Step S15).

Subsequently, the lack defect area specification part 334 obtains a logical product (AND) of the difference area data D3 acquired in Step S14 and the comparison CAD data F1 acquired in Step S13 (i.e., the input CAD data D1) by computation to acquire the lack defect area data D3b specifying the lack defect area Af (Step S16).

The execution order of Steps S15 and S16 may be inverted. Specifically, any one of the process for acquiring the lack defect area data D3b and the process for acquiring the excess defect area data D3a may be executed first.

Subsequently, the defect repair part 34 judges if the defect detection part 33 detects any defect in the run-length data D2 (in other words, if any difference area is detected) on the basis of the difference area data D3 acquired in Step S14 (Step S17).

If it is judged that some defect is detected in Step S17, the defect repair part 34 repairs the detected defect to acquire the repaired run-length data D4 (Step S18). First, the excess defect repair part 341 repairs an excess defect. Specifically, the excess defect repair part 341 specifies the excess defect area Ae in the run-length data D2 on the basis of the excess defect area data D3a acquired in Step S15 and deletes the run data existing in this area, to repair the excess defect. Further, the lack defect repair part 342 repairs a lack defect. Specifically, the lack defect repair part 342 specifies the lack defect area Af in the run-length data D2 on the basis of the lack defect area data D3b acquired in Step S16 and generates new run data by performing the RIP process again on this area, to repair the lack defect. Through these operations, the repaired run-length data D4 can be acquired.

Subsequently, the drawing run-length data acquisition part 35 acquires the repaired run-length data D4 acquired in Step S18 as the drawing run-length data T (Step S19).

On the other hand, if it is judged that no defect is detected in Step S17, the process goes to Step S20 without executing Step S18. In Step S20, the drawing run-length data acquisition part 35 acquires the run-length data D2 acquired in Step S12 as the drawing run-length data T (Step S20).

After the drawing run-length data T is acquired by executing either Step S19 or Step S20, the drawing run-length data transmitting part 36 transmits the acquired drawing run-length data T to the drawing apparatus 4 (Step S21). The drawing apparatus 4 performs drawing on the basis of the drawing run-length data T (Step S4 in FIG. 7). The above is a series of operations performed by the defect inspection apparatus 3.

3. Effects

In the above-discussed preferred embodiment, since the defect inspection apparatus 3 compares the data before and after the RIP process, i.e., the input CAD data D1 and the run-length data D2, to detect any defect in the run-length data D2, it is possible to detect any defect in the run-length data D2 before the drawing apparatus 4 performs drawing on the basis of the run-length data D2 (in other words, even if the drawing apparatus 4 does not perform drawing).

Further, for detection of defects, it is not necessary to provide a plurality of functional parts for the RIP processes nor to perform the RIP process a plurality of times. Therefore, it is possible to detect defects occurring in the run-length data D2 with simple constitution.

If any defect is detected in the run-length data D2, since the defect is repaired to generate the repaired run-length data D4, it is possible to acquire the run-length data with no defect.

If any defect is detected in the run-length data D2, the repaired run-length data D4 is transmitted to the drawing apparatus 4 as the drawing run-length data T and the drawing apparatus 4 performs drawing on the basis of the drawing run-length data T. Therefore, since the drawing apparatus 4 does not perform drawing of patterns on the basis of the defective run-length data D2, there arises no waste substrate.

Further, in the above-discussed preferred embodiment, if the CAD data is subjected to a correction process, it is possible to efficiently check the correction. Specifically, by performing the following operation, the correction made on the CAD data can be checked.

First, the "uncorrected CAD data (CAD data before correction)" is acquired from the CAD device 1 as the input CAD data D1 and the run-length data obtained by performing the RIP development on the "corrected CAD data" (i.e., the run-length data generated from the corrected CAD data) is acquired from the RIP device 2 as the run-length data D2. Then, the acquired input CAD data D1 and the run-length data D2 are compared with each other to detect any deference between these data, and the difference area data D3 is thus acquired. In the difference area data D3, part of the CAD data which is corrected is detected as a difference area. In other words, from the acquired difference area data D3, it is possible to efficiently check how the correction is made on the CAD data. Further, by checking if the part of the CAD data which is corrected is properly detected as the difference area, it is possible to verify if the correction made on the CAD data is properly reflected on the generated run-length data.

As a matter of course, if the "corrected CAD data" is acquired from the CAD device 1 as the input CAD data D1 and this data is compared with the run-length data generated from the corrected CAD data, it is possible to verify if correct run-length data is generated on the basis of the corrected CAD data (i.e., to detect any defect in the run-length data).

The Second Preferred Embodiment

Construction and Structure

1a. Overall Structure of Figure Drawing Section

Herein, discussion will be made on a figure drawing system in accordance with the second preferred embodiment of the present invention. In the following discussion, only constituent elements different from those in the first preferred embodiment will be discussed and description on the same constituents will be omitted. The same constituents will be represented by the same reference signs as those in the first preferred embodiment as appropriate.

The figure drawing system of the second preferred embodiment, like the figure drawing system 100 of the first preferred embodiment, comprises the CAD device 1, the RIP device 2, the defect inspection apparatus 5 and the drawing apparatus 4 which are connected with one another via the network N such as LAN (see FIG. 1). The respective constitutions of the CAD device 1, the RIP device 2 and the drawing apparatus 4 are the same as those of the first preferred embodiment. The defect inspection apparatus 5 inspects any defect in the run-length data D2 to be used for drawing, like the defect inspection apparatus 3 of the first preferred embodiment. Next, specific constitution of the defect inspection apparatus 5 will be discussed.

1b. Constitution of Defect Inspection Apparatus

The defect inspection apparatus 5 is implemented by the same hardware structure as that of the defect inspection apparatus 3 of the first preferred embodiment (see FIG. 2).

Figure 9:
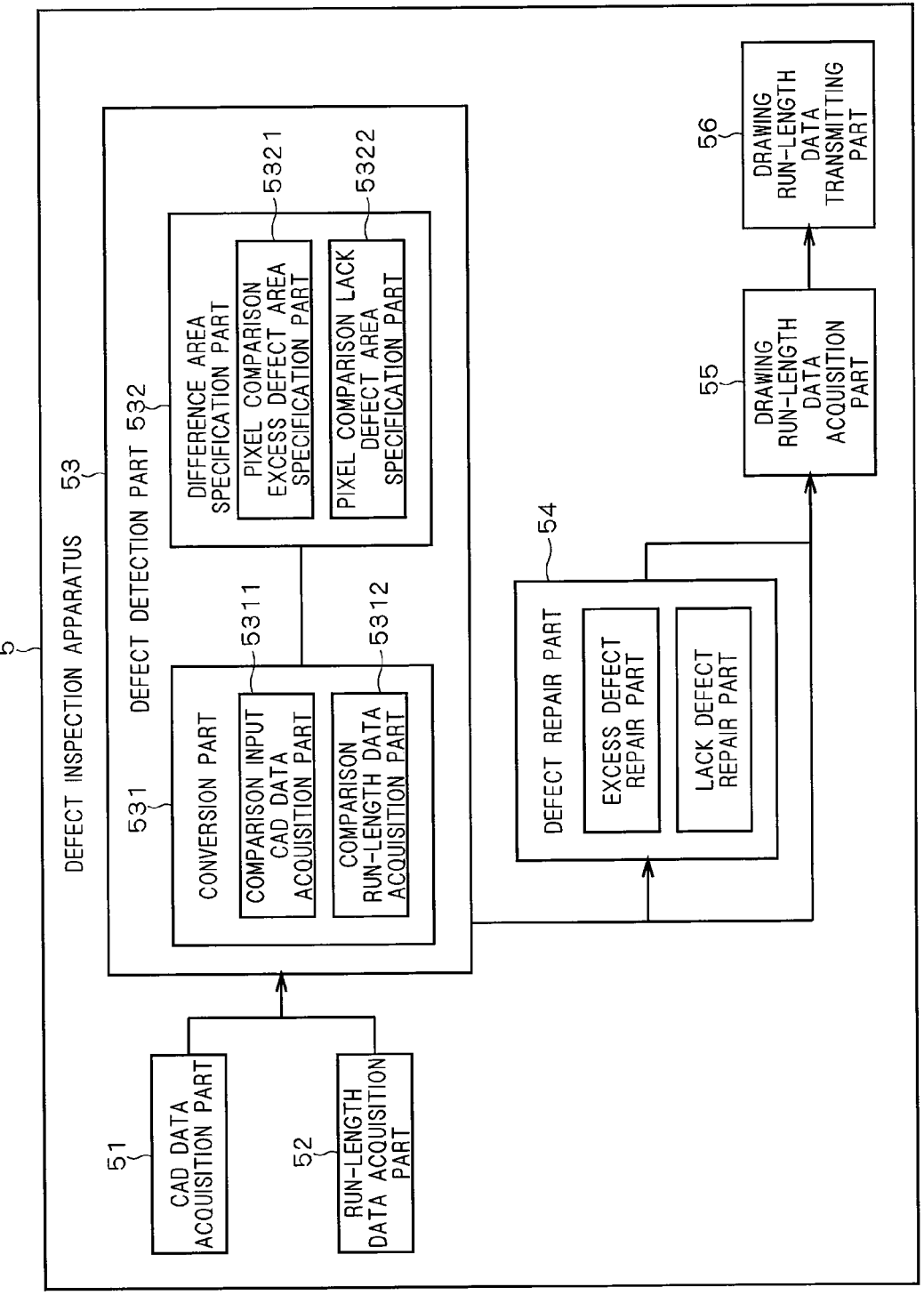
FIG. 9 is a schematic view showing a functional structure of a defect inspection apparatus.
Figure 10:
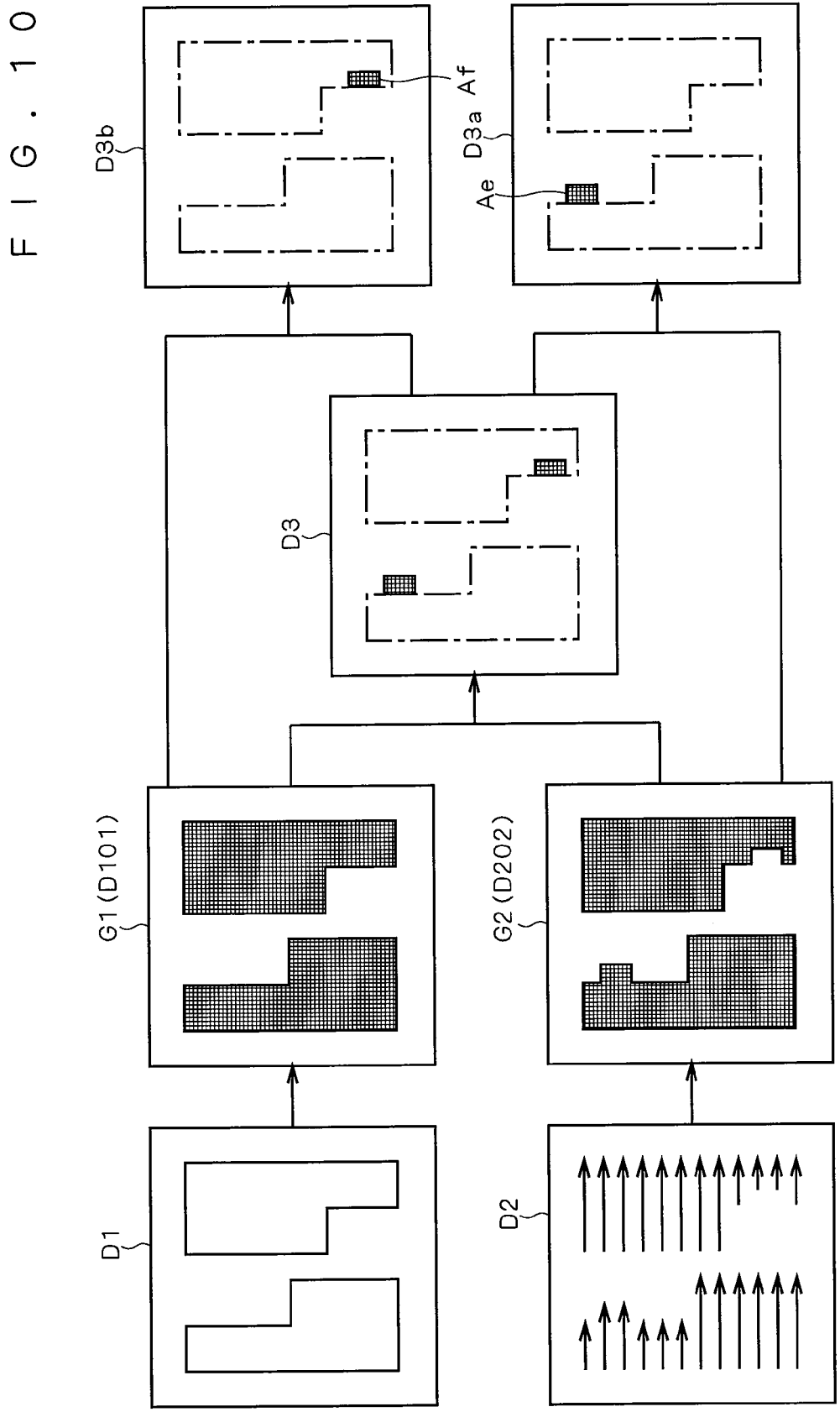
FIG. 10 is a schematic diagram showing various data acquired in a defect detection process and the correlation thereof.

A functional structure of the defect inspection apparatus 5 will be discussed with reference to FIGS. 9 and 10. FIG. 9 is a schematic view showing the functional structure of the defect inspection apparatus 5. FIG. 10 is a schematic diagram showing various data acquired in a defect detection process performed by the defect inspection apparatus 5 and the correlation thereof.

The defect inspection apparatus 5 comprises a CAD data acquisition part 51, a run-length data acquisition part 52, a defect detection part 53, a defect repair part 54, a drawing run-length data acquisition part 55 and a drawing run-length data transmitting part 56. The functions of these constituent elements are implemented by reading the program P stored in the ROM 12 and the like in advance or the program P recorded in the recording medium M and executing the program P by the control part 11 (see FIG. 2). The functions of the CAD data acquisition part 51, the run-length data acquisition part 52, the defect repair part 54, the drawing run-length data acquisition part 55 and the drawing run-length data transmitting part 56 are the same as those of the CAD data acquisition part 31, the run-length data acquisition part 32, the defect repair part 34, the drawing run-length data acquisition part 35 and the drawing run-length data transmitting part 36, respectively.

The defect detection part 53 detects any defect in the run-length data D2. More specifically, the defect detection part 53 compares the input CAD data D1 with the run-length data D2, and if there is a difference area, it detects the difference area as a defect area in the run-length data D2. The defect detection part 53 comprises a conversion part 531 and a difference area specification part 532.

The conversion part 531 performs a predetermined conversion process on both the input CAD data D1 and the run-length data D2 which are described in different formats to acquire comparison CAD data G1 and comparison run-length data G2 whose data formats are made comparable (see FIG. 10). The conversion part 531 comprises a comparison input CAD data acquisition part 5311 and a comparison run-length data acquisition part 5312.

The comparison input CAD data acquisition part 5311 performs a CAD data imaging process on the input CAD data D1 acquired by the CAD data acquisition part 51 and acquires imaged CAD data D101 obtained by performing this process as the comparison CAD data G1 (see FIG. 10).

Figure 11:
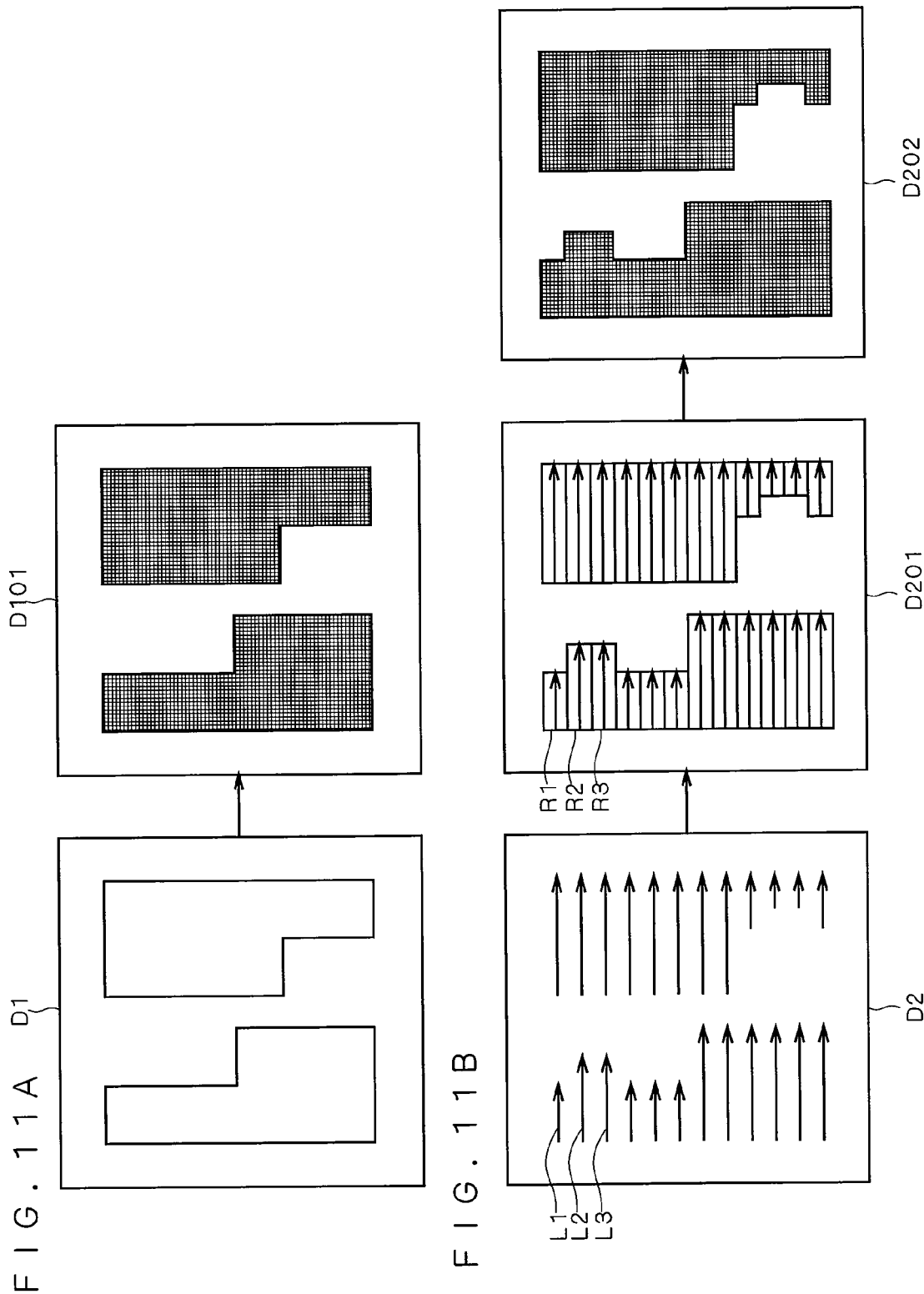
FIGS. 11A and 11B are schematic diagrams illustrating a CAD data imaging process and a run-length data imaging process.

The "CAD data imaging process" refers to a process to convert the input CAD data D1 described by figures into a data format described by images as shown in FIG. 11A. In the CAD data imaging process, performed is an operation to fill the inside of polygon for each of polygon (figure) data included in the input CAD data D1. With this operation, an image of polygon whose contour is defined by the figure data is generated. In other words, the figure data is converted into image data. This process is performed on all the figure data included in the input CAD data D1 to acquire the imaged CAD data D101.

The comparison run-length data acquisition part 5312 performs a run-length data imaging process on the run-length data D2 acquired by the run-length data acquisition part 52 and acquires imaged run-length data D202 obtained by performing this process as the comparison run-length data G2 (see FIG. 10).

The "run-length data imaging process" refers to a process to convert the run-length data D2 described by a plurality of runs Li (i=1, 2 . . . ) into a data format described by images as shown in FIG. 11B. More specifically, in the run-length data imaging process, performed is an operation to fill corresponding pixels in accordance with coordinate-value information of runs Li in the run-length data D2. In the run-length data imaging process, first, rectangle areas Ri (i=1, 2 . . . ) are defined (D201) on the basis of a plurality of runs Li (i=1, 2 . . . ) constituting the run-length data D2, respectively, and the pixels corresponding to the respective rectangle areas Ri (i=1, 2 . . . ) are filled (D202). With this operation, the run-length data D2 is converted from the data described by a plurality of runs Li into the data D202 described by a set of pixels. In other words, the imaged run-length data D202 is thus acquired.

Referring to FIG. 9 again, the difference area specification part 532 compares the comparison CAD data G1 with the comparison run-length data G2 to detect any difference between these data. More specifically, the difference area specification part 532 compares the comparison CAD data G1 (i.e., the imaged CAD data D100 in this case) with the comparison run-length data G2 (i.e., the imaged run-length data D202 in this case) by pixels (specifically, checks if there is a pixel in the same coordinate position of each of these data) to acquire the difference area data D3 specifying a difference area between these data (specifically, an area in which there is a pixel in either one data).

In particular, the difference area specification part 532 comprises a pixel comparison excess defect area specification part 5321 and a pixel comparison lack defect area specification part 5322. The pixel comparison excess defect area specification part 5321 extracts an area in which there is a pixel only in the imaged run-length data D202 as the excess defect area Ae and acquires the excess defect area data D3a specifying the excess defect area Ae. The pixel comparison lack defect area specification part 5322 extracts an area in which there is a pixel only in the imaged CAD data D101 as the lack defect area Af and acquires the lack defect area data D3b specifying the lack defect area Af.

2. Process Operation

2a. Operation of Figure Drawing System

An overall operation flow of a process performed by the figure drawing system of the second preferred embodiment is the same as the operation flow performed by the figure drawing system 100 of the first preferred embodiment (see FIG. 7).

2b. Operation of Defect Inspection Apparatus 5

Herein, the process (i.e., the defect inspection process and the defect repair process) performed by the defect inspection apparatus 5 will be discussed. Since the operation flow performed by the defect inspection apparatus 5 is almost the same as that performed by the defect inspection apparatus 3 of the first preferred embodiment (see FIG. 8), process steps different from those in the first preferred embodiment will be discussed below with reference to FIG. 8.

First, the CAD data acquisition part 51 acquires the input CAD data D1 from the CAD device 1 and the run-length data acquisition part 52 acquires the run-length data D2 from the RIP device 2 (see Steps S11 to S12).

Subsequently, the defect detection part 53 detects any defect in the run-length data D2 acquired in the preceding step (see Step S12) (see Steps S13 to S16).

Specifically, first, the conversion part 531 acquires the comparison CAD data G1 and the comparison run-length data G2 whose data formats are made comparable (see Step S13). More specifically, the comparison input CAD data acquisition part 5311 performs the CAD data imaging process on the input CAD data D1 (i.e., data acquired by the CAD data acquisition part 51 in the preceding step (see Step S11)) to acquire the imaged CAD data D101 obtained by performing this process as the comparison CAD data G1. The comparison run-length data acquisition part 5312 performs the run-length data imaging process on the run-length data D2 (i.e., data acquired by the run-length data acquisition part 52 in the preceding step (see Step S12)) to acquire the imaged run-length data D202 obtained by performing this process as the comparison run-length data G2.

Subsequently, the difference area specification part 532 compares the comparison CAD data G1 with the comparison run-length data G2 by pixels to acquire the difference area data D3 specifying the difference area between these data (see Step S14).

Further, the difference area specification part 532 extracts an area which is constituted of excess pixels (i.e., the excess defect area Ae) out of the difference area, to acquire the excess defect area data D3a (see Step S15).

Furthermore, the difference area specification part 532 extracts an area which is constituted of lack pixels (i.e., the lack defect area Af) out of the difference area, to acquire the lack defect area data D3b (see Step S16).

Subsequently, the defect repair part 54 judges if the defect detection part 53 detects any defect in the run-length data D2 (in other words, if any difference area is detected) on the basis of the difference area data D3 acquired in the preceding step (see Step S14) (see Step S17).

If it is judged that some defect is detected, the defect repair part 54 repairs the detected defect to acquire the repaired run-length data D4 (see Step S18) and the drawing run-length data acquisition part 55 acquires the repaired run-length data D4 which is thus acquired as the drawing run-length data T (see Step S19). Then, the drawing run-length data transmitting part 56 transmits the acquired drawing run-length data T to the drawing apparatus 4 (see Step S21).

On the other hand, if it is judged that no defect is detected, the drawing run-length data acquisition part 55 acquires the run-length data D2 which is acquired in the preceding step (see Step S12) as the drawing run-length data T (see Step S20). Then, the drawing run-length data transmitting part 56 transmits the acquired drawing run-length data T to the drawing apparatus 4 (see Step S21).

The Third Preferred Embodiment

Constitution and Structure

1a. Overall Structure of Figure Drawing System

Herein, discussion will be made on a figure drawing system in accordance with the third preferred embodiment of the present invention. In the following discussion, only constituent elements different from those in the first preferred embodiment will be discussed and description on the same constituents will be omitted. The same constituents will be represented by the same reference signs as those in the first preferred embodiment as appropriate.

The figure drawing system of the third preferred embodiment, like the figure drawing system 100 of the first preferred embodiment, comprises the CAD device 1, the RIP device 2, the defect inspection apparatus 6 and the drawing apparatus 4 which are connected with one another via the network N such as LAN (see FIG. 1). The respective constitutions of the CAD device 1, the RIP device 2 and the drawing apparatus 4 are the same as those of the first preferred embodiment. The defect inspection apparatus 6 inspects any defect in the run-length data D2 to be used for drawing, like the defect inspection apparatus 3 of the first preferred embodiment. Next, specific constitution of the defect inspection apparatus 6 will be discussed.

1b. Constitution of Defect Inspection Apparatus

The defect inspection apparatus 6 is implemented by the same hardware structure as that of the defect inspection apparatus 3 of the first preferred embodiment (see FIG. 2).

Figure 12:
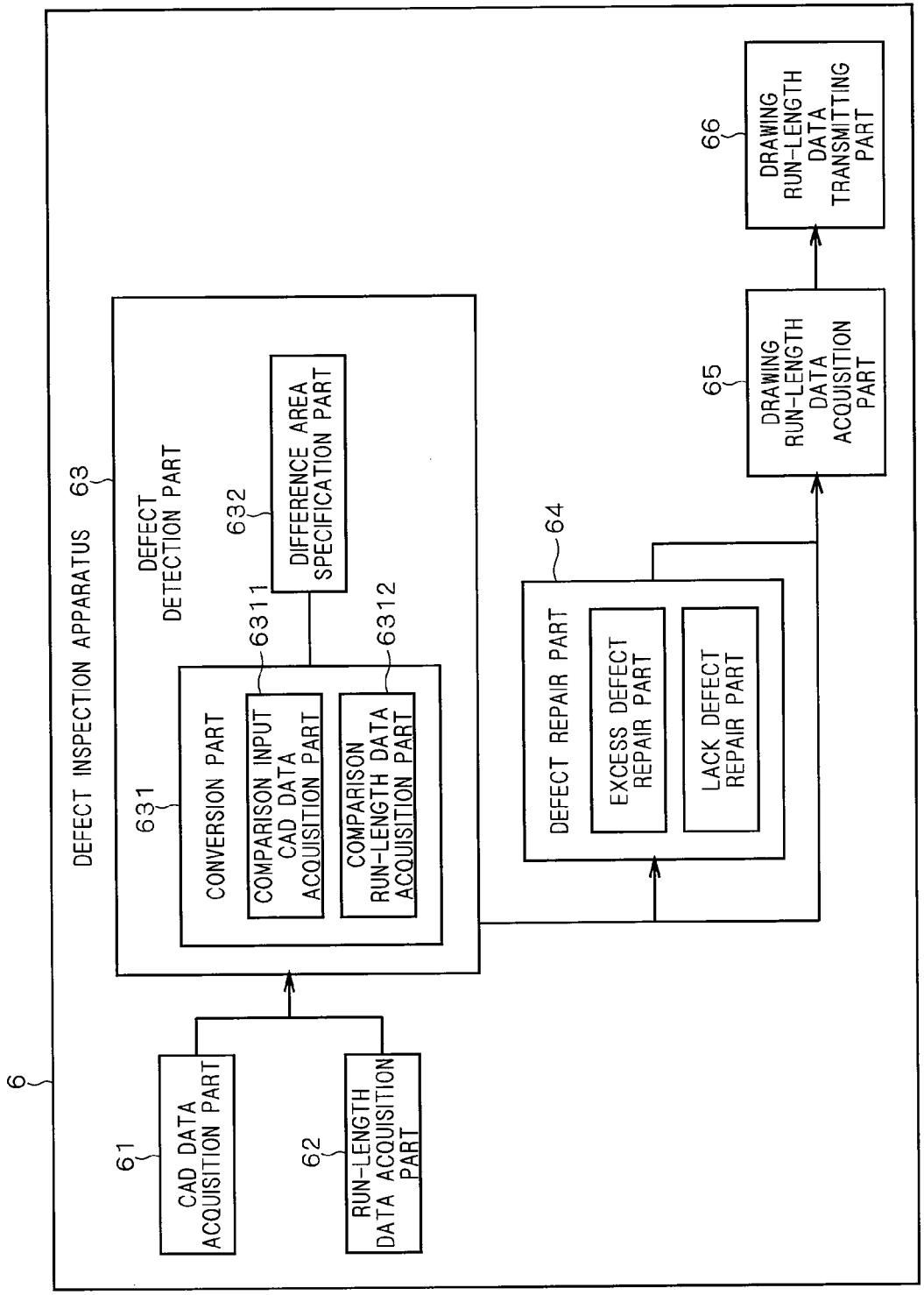
FIG. 12 is a schematic view showing a functional structure of a defect inspection apparatus.
Figure 13:
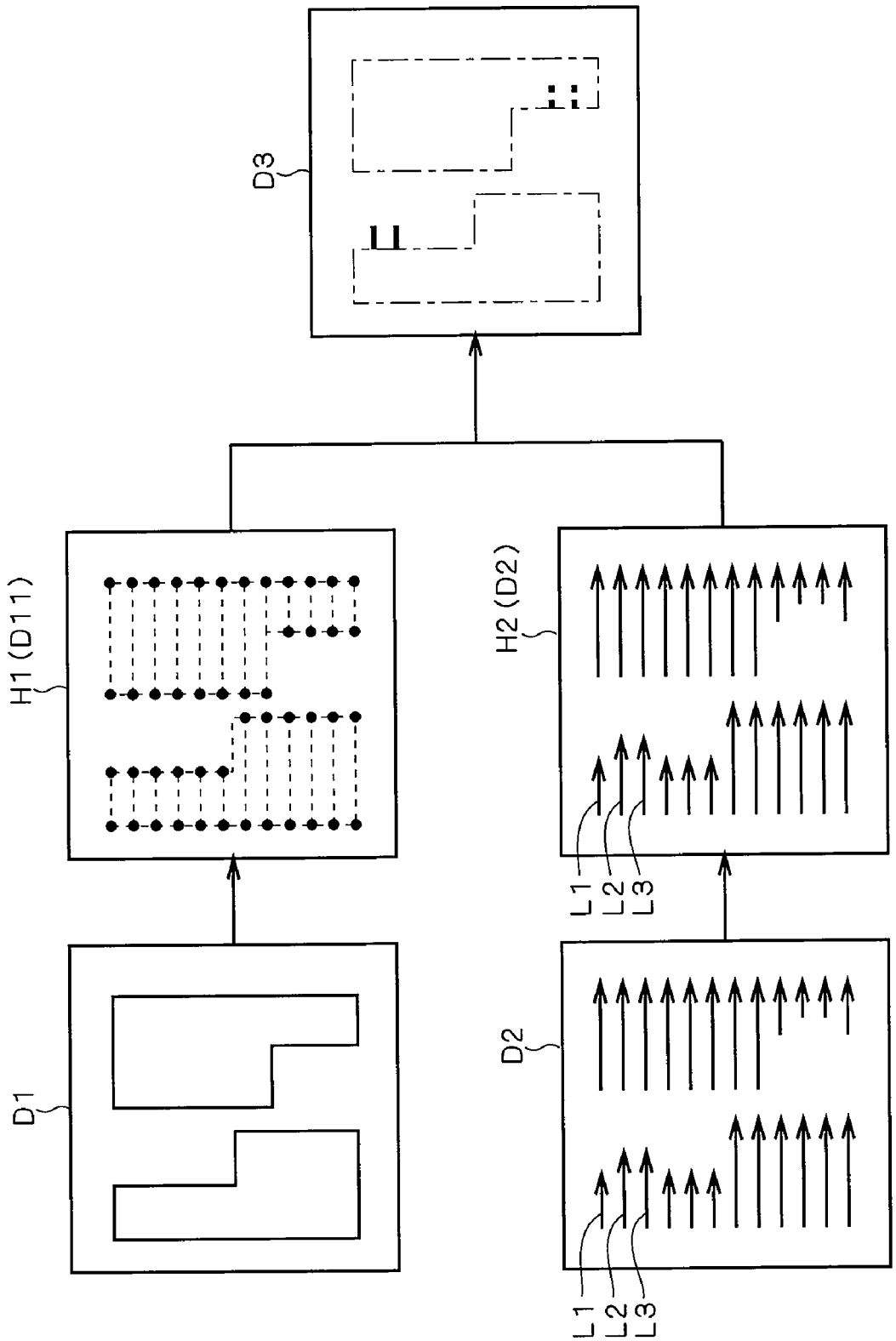
FIG. 13 is a schematic diagram showing various data acquired in a defect detection process performed by the defect inspection apparatus and the correlation thereof.

A functional structure of the defect inspection apparatus 6 will be discussed with reference to FIGS. 12 and 13. FIG. 12 is a schematic view showing the functional structure of the defect inspection apparatus 6. FIG. 13 is a schematic diagram showing various data acquired in a defect detection process performed by the defect inspection apparatus 6 and the correlation thereof.

The defect inspection apparatus 6 comprises a CAD data acquisition part 61, a run-length data acquisition part 62, a defect detection part 63, a defect repair part 64, a drawing run-length data acquisition part 65 and a drawing run-length data transmitting part 66. The functions of these constituent elements are implemented by reading the program P stored in the ROM 12 and the like in advance or the program P recorded in the recording medium M and executing the program P by the control part 11 (see FIG. 2). The functions of the CAD data acquisition part 61, the run-length data acquisition part 62, the defect repair part 64, the drawing run-length data acquisition part 65 and the drawing run-length data transmitting part 66 are the same as those of the CAD data acquisition part 31, the run-length data acquisition part 32, the defect repair part 34, the drawing run-length data acquisition part 35 and the drawing run-length data transmitting part 36, respectively.

The defect detection part 63 detects any defect in the run-length data D2. More specifically, the defect detection part 63 compares the input CAD data D1 with the run-length data D2, and if there is a difference area, it detects the difference area as a defect area in the run-length data D2. The defect detection part 63 comprises a conversion part 631 and a difference area specification part 632.

The conversion part 631 performs a predetermined conversion process on at least one of the input CAD data D1 and the run-length data D2 which are described in different formats (herein, the input CAD data D1) to acquire comparison CAD data H1 and comparison run-length data H2 whose data formats are made comparable (see FIG. 13). The conversion part 631 comprises a comparison input CAD data acquisition part 6311 and a comparison run-length data acquisition part 6312.

The comparison input CAD data acquisition part 6311 performs a coordinating process on the input CAD data D1 acquired by the CAD data acquisition part 61 and acquires coordinated CAD data D11 obtained by performing this process as the comparison CAD data H1 (see FIG. 13).

Figure 14:
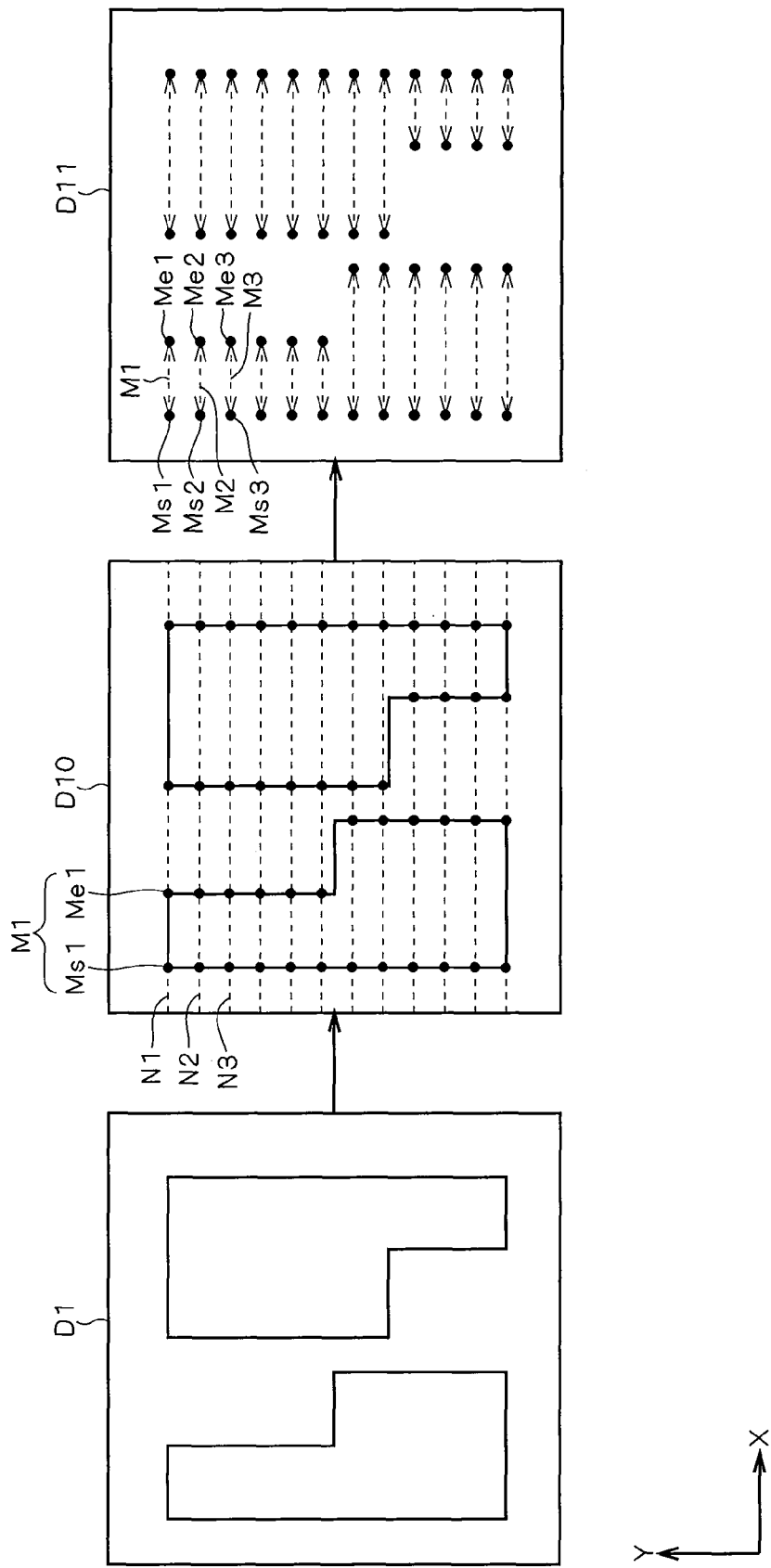
FIG. 14 is a schematic diagram illustrating a coordinating process.

The "coordinating process" refers to a process to convert the input CAD data D1 described by figures into a data format described by a set of coordinate values as shown in FIG. 14. In the coordinating process, first, a plurality of straight lines Ni (i=1, 2 . . . ) parallel to a scan direction (or a subscan direction) are defined (D10) in the input CAD data D1. Then acquired is coordinate information on intersection points of straight lines Ni and polygons included in the input CAD data D1. Each of the straight lines Ni (i=1, 2 . . . ) intersects each polygon at two points and the coordinate values of the two points are determined as a pair of coordinate values (hereinafter, referred to as "coordinate-value pair Mi (i=1, 2 . . . )". Further, one coordinate value of the coordinate-value pair Mi which has a smaller X coordinate value is defined as a starting point coordinate value Msi (i=1, 2 . . . ) and the other one coordinate value is defined as end point coordinate value Mei (i=1, 2 . . . ). Thus acquired is the coordinated CAD data D11 in which each of the polygons included in the input CAD data D1 is defined by a plurality of coordinate-value pairs Mi (the starting point coordinate values Msi and the end point coordinate values Mei) (i=1, 2 . . . ).

Referring to FIG. 12 again, the comparison run-length data acquisition part 6312 acquires the run-length data D2 which is acquired by the run-length data acquisition part 62 as the comparison run-length data H2 (see FIG. 13).

The difference area specification part 632 compares the comparison CAD data H1 with the comparison run-length data H2 to detect any difference between these data. More specifically, the difference area specification part 632 compares each of a plurality of runs Li (i=1, 2 . . . ) included in the comparison run-length data H2 (i.e., the run-length data D2 in this case) with each of a plurality of coordinate-value pairs Mi (i=1, 2 . . . ) included in the comparison CAD data H1 (i.e., the coordinated CAD data D11 in this case) (specifically, compares the starting point position of each run Li with the starting point coordinate value Msi of the coordinate-value pair Mi corresponding to the run Li and compares the end point position of each run Li with the end point coordinate value Mei of the coordinate-value pair Mi corresponding to the run Li) to specify a difference area between these data (the excess defect area Ae and the lack defect area Af) and acquires the difference area data D3. It is assumed, however, that the coordinate-value pairs Mi included in the coordinated CAD data D11 and the starting point positions and the end point positions of the runs Li (i=1, 2 . . . ) included in the run-length data D2 are represented by using a common coordinate system (e.g., a common coordinate system using the origin point coordinate of the CAD data as the common reference).

Figure 15:
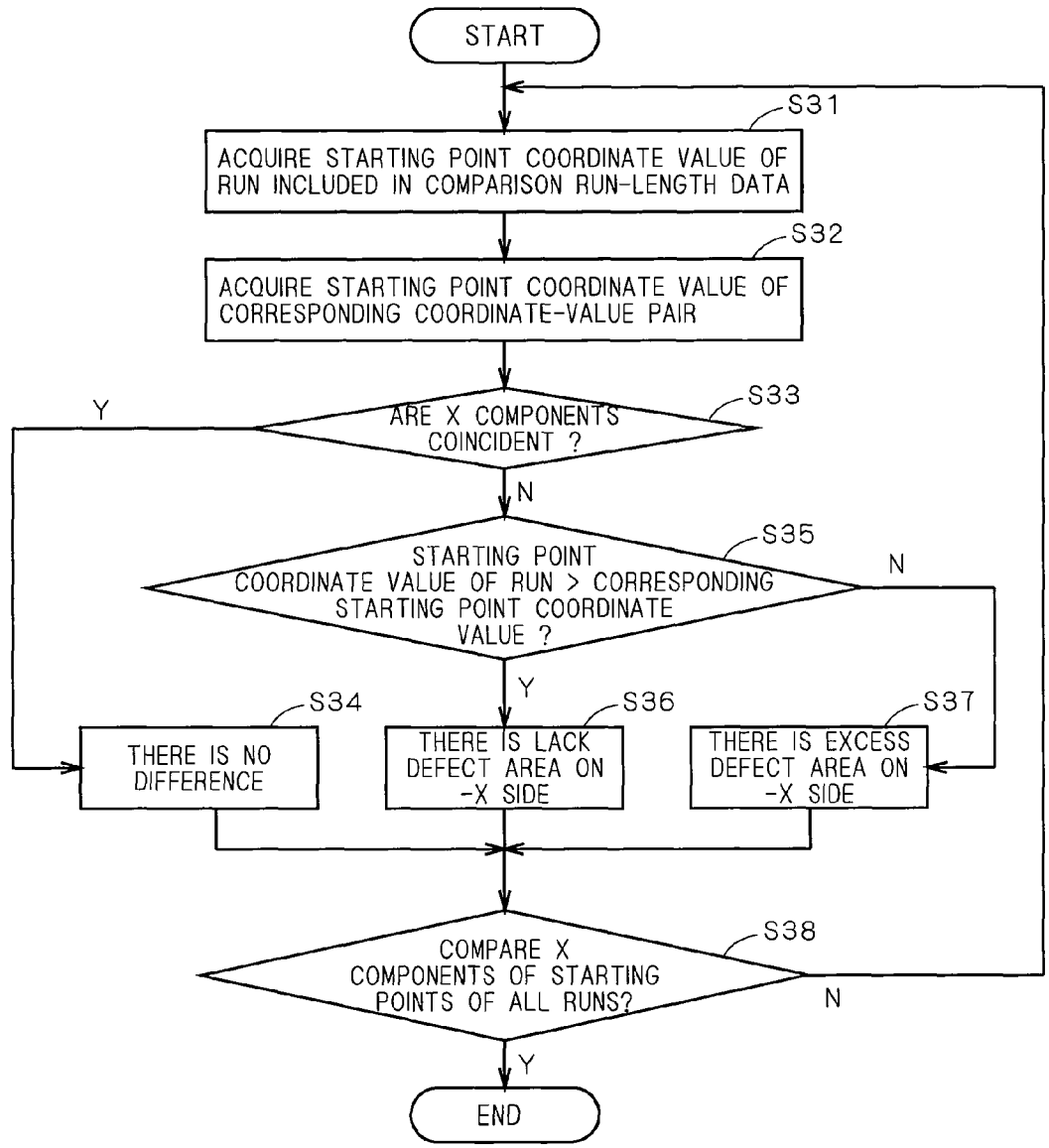
FIG. 15 is a flowchart showing a flow of operation performed by a difference area specification part.
Figure 16:
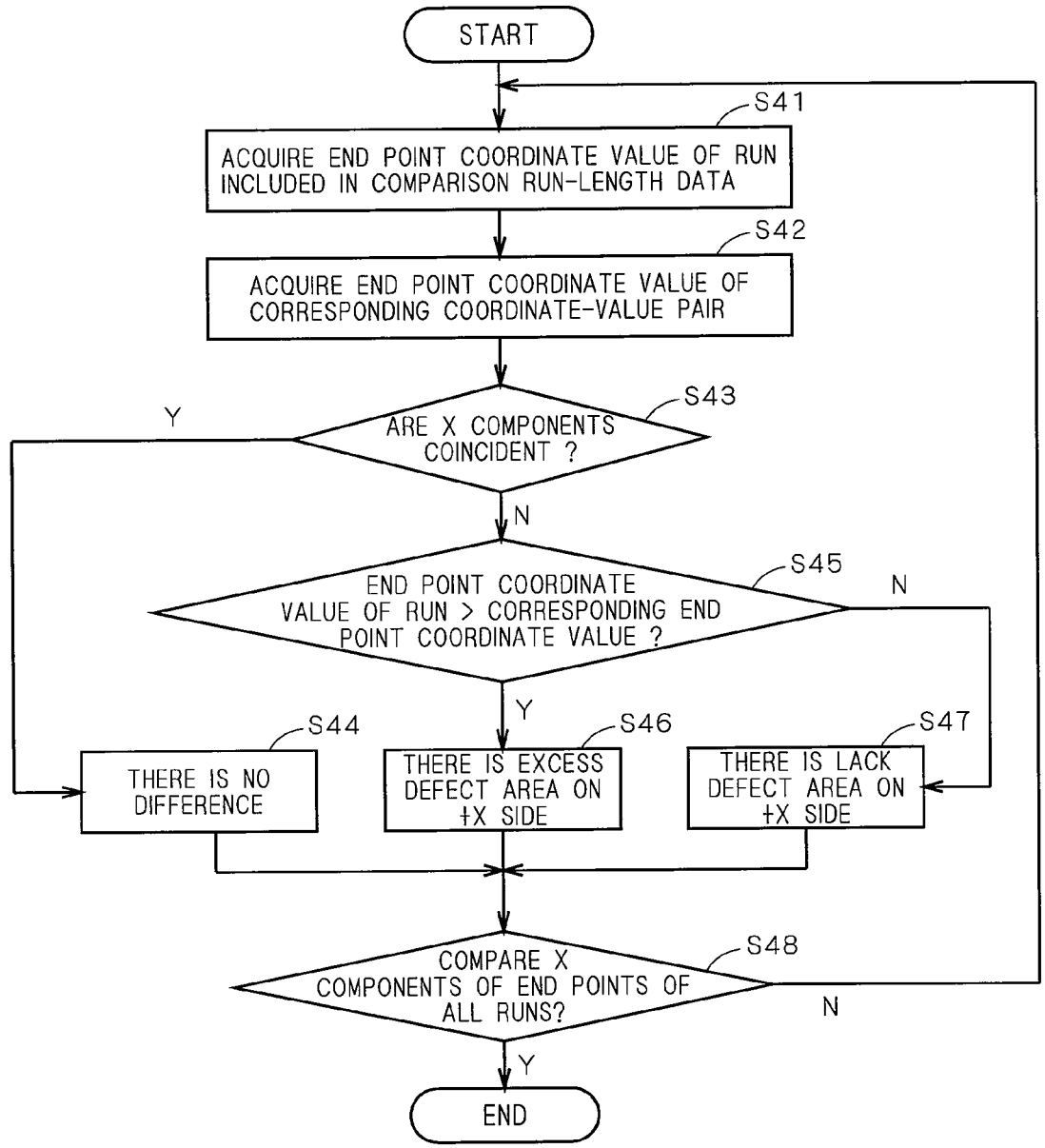
FIG. 16 is a flowchart showing a flow of operation performed by the difference area specification part.
Figure 17:
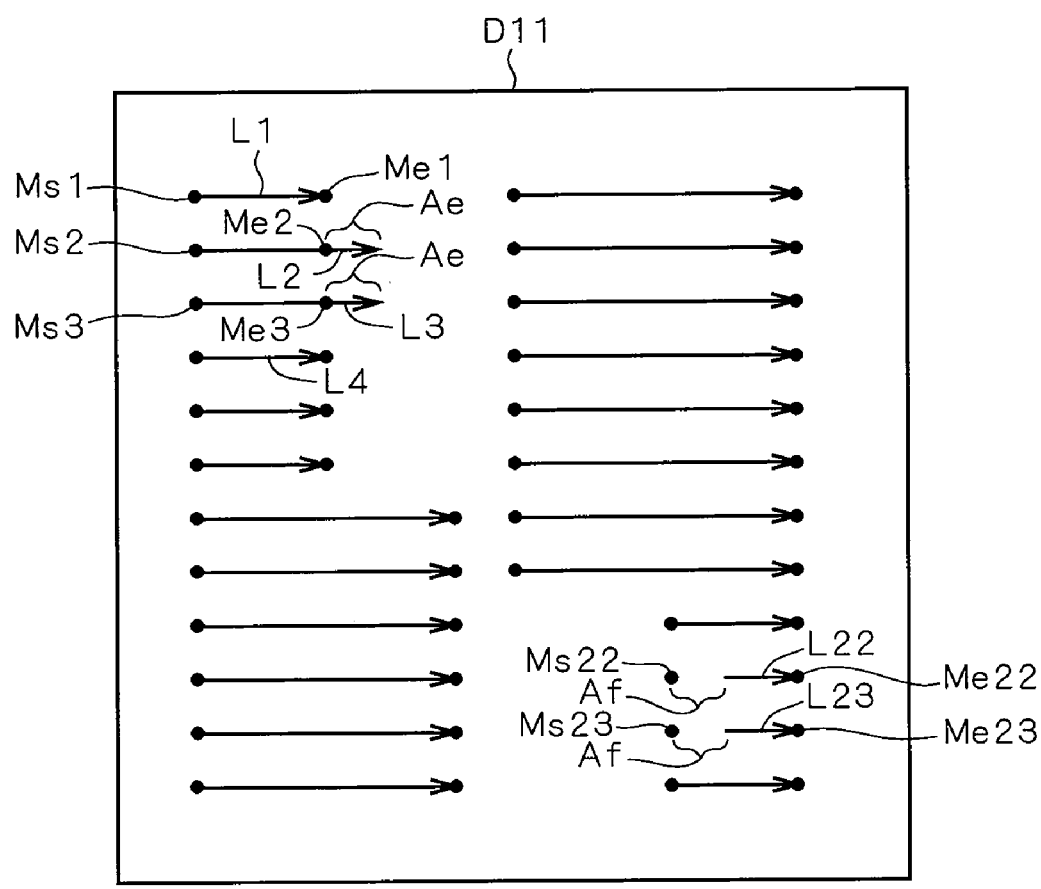
FIG. 17 is a schematic diagram illustrating a difference area.

Specific discussion will be made below on an operation of the difference area specification part 632 for specifying the difference area (the excess defect area Ae and the lack defect area Af) with reference to FIGS. 15 to 17). FIGS. 15 and 16 are flowcharts showing a flow of operation performed by the difference area specification part 632. FIG. 17 is a schematic diagram illustrating a difference area.

(Specification of Difference Area on −X Side)

The difference area specification part 632 compares the starting point position of each of the runs Li (i=1, 2 . . . ) included in the comparison run-length data H2 with the starting point coordinate value Msi of each of the coordinate-value pairs Mi (i=1, 2 . . . ) included in the comparison CAD data H1, to specify a difference area existing on −X side of the comparison run-length data H2 (specifically, on −X side of the polygon to be drawn).

The operation of specifying the difference area existing on the −X side will be discussed with reference to FIGS. 15 and 17. The difference area specification part 632 first selects one of the runs Li (i=1, 2 . . . ) included in the comparison run-length data H2 and acquires the starting point coordinate value of the run ("run Lt") (Step S31).

Subsequently, the difference area specification part 632 acquires the starting point coordinate value Msi ("starting point coordinate value Mst") of the coordinate-value pair Mi ("coordinate-value pair Mt") corresponding to the run Lt acquired in Step S31 among the coordinate-value pairs Mi (i=1, 2 . . . ) included in the comparison CAD data H1 (Step S32). The "corresponding coordinate-value pair" refers to a coordinate-value pair having a relation where a line segment area connecting the starting point coordinate value Msi and the end point coordinate value Mei of the coordinate-value pair Mi is originally coincident with the run Lt (if the run Lt is correctly generated). For example, the coordinate-value pair which is derived from the same polygon as the run Lt and has Y coordinate value equal to (or nearest to) the run Lt is acquired as "the corresponding coordinate-value pair Mt".

Next, it is judged whether or not the X component of the starting point coordinate value of the run Lt acquired from the comparison run-length data H2 in Step S31 is coincident with the X component of the corresponding starting point coordinate value Mst (the starting point coordinate value Mst acquired from the comparison CAD data H1 in Step S32) (Step S33).

If it is judged that these values are coincident with each other in Step S33, the run Lt is not judged to be a constituent of a difference area on the −X side (Step S34) (e.g., the run L1 and the starting point coordinate value Ms1, the run L2 and the starting point coordinate value Ms2 in FIG. 17).

On the other hand, if it is judged that these values are not coincident with each other in Step S33, the run Lt is judged to be a constituent of a difference area on the −X side. In this case, by judging whether or not the X component of the starting point coordinate value of the run Lt acquired from the comparison run-length data H2 is larger than the X component of the corresponding starting point coordinate value Mst, it is judged whether the run Lt is a constituent of a lack defect area Af or an excess defect area Ae (Step S35).

Specifically, if it is judged in Step S35 that the X component of the starting point coordinate value of the run Lt is larger than the X component of the corresponding starting point coordinate value Mst, it is judged that the run Lt is a constituent of a lack defect area Af on the −X side (Step S36) (e.g., the run L22 and the starting point coordinate value Ms22, the run L23 and the starting point coordinate value Ms23 in FIG. 17). In this case, the difference area specification part 632 extracts a line segment area with the starting point coordinate value Mst as the starting point position and with the starting point coordinate value of the run Lt as the end point position, as the lack defect area Af.

On the other hand, if it is judged in Step S35 that the X component of the starting point coordinate value of the run Lt is smaller than the X component of the corresponding starting point coordinate value Mst, it is judged that the run Lt is a constituent of an excess defect area Ae on the −X side (Step S37). In this case, the difference area specification part 632 extracts a line segment area with the starting point coordinate value of the run Lt as the starting point position and with the starting point coordinate value Mst as the end point position, as the excess defect area Ae.

The above operations in Steps S31 to S37 are performed on all the runs Li (i=1, 2 . . . ) included in the comparison run-length data H2. When the operations in Steps S31 to S37 are completed on all the runs Li, this process is finished (Step S38).

(Specification of Difference Area on +X Side)

The difference area specification part 632 compares the end point position of each of the runs Li (i=1, 2 . . . ) included in the comparison run-length data H2 with the end point coordinate value Mei of each of the coordinate-value pairs Mi (i=1, 2 . . . ) included in the comparison CAD data H1, to specify a difference area existing on +X side of the comparison run-length data H2 (specifically, on +X side of the polygon to be drawn).

The operation of specifying the difference area existing on the +X side will be discussed with reference to FIGS. 16 and 17. The difference area specification part 632 first selects one of the runs Li (i=1, 2 . . . ) included in the comparison run-length data H2 and acquires the end point coordinate value of the run ("run Lt") (Step S41).

Subsequently, the difference area specification part 632 acquires the end point coordinate value Mei ("end point coordinate value Met") of the coordinate-value pair Mi ("coordinate-value pair Mt") corresponding to the run Lt acquired in Step S41 among the coordinate-value pairs Mi (i=1, 2 . . . ) included in the comparison CAD data H1 (Step S42).

Next, it is judged whether or not the X component of the end point coordinate value of the run Lt acquired from the comparison run-length data H2 in Step S41 is coincident with the X component of the corresponding end point coordinate value Met (the end point coordinate value Met acquired from the comparison CAD data H1 in Step S42) (Step S43).

If it is judged that these values are coincident with each other in Step S43, the run Lt is not judged to be a constituent of a difference area on the +X side (Step S44) (e.g., the run LI and the end point coordinate value Me1, the run L22 and the end point coordinate value Me22 in FIG. 17).

On the other hand, if it is judged that these values are not coincident with each other in Step S43, the run Lt is judged to be a constituent of a difference area on the +X side. In this case, by judging whether or not the X component of the end point coordinate value of the run Lt acquired from the comparison run-length data H2 is larger than the X component of the corresponding end point coordinate value Met, it is judged whether the run Lt is a constituent of a lack defect area Af or an excess defect area Ae (Step S45).

Specifically, if it is judged in Step S45 that the X component of the end point coordinate value of the run Lt is larger than the X component of the corresponding end point coordinate value Met, it is judged that the run Lt is a constituent of an excess defect area Ae on the +X side (Step S46) (e.g., the run L2 and the end point coordinate value Me2, the run L3 and the end point coordinate value Me3 in FIG. 17). In this case, the difference area specification part 632 extracts a line segment area with the end point coordinate value Met as the starting point position and with the end point coordinate value of the run Lt as the end point position, as the excess defect area Ae.

On the other hand, if it is judged in Step S45 that the X component of the end point coordinate value of the run Lt is smaller than the X component of the corresponding end point coordinate value Met, it is judged that the run Lt is a constituent of a lack defect area Af on the +X side (Step S47). In this case, the difference area specification part 632 extracts a line segment area with the end point coordinate value of the run Lt as the starting point position and with the end point coordinate value Met as the end point position, as the lack defect area Af.

The above operations in Steps S41 to S47 are performed on all the runs Li (i=1, 2 . . . ) included in the comparison run-length data H2. When the operations in Steps S41 to S47 are completed on all the runs Li, this process is finished (Step S48).

2. Process Operation

2a. Operation of Figure Drawing System

An overall operation flow of a process performed by the figure drawing system of the third preferred embodiment is the same as the operation flow performed by the figure drawing system 100 of the first preferred embodiment (see FIG. 7).

2b. Operation of Defect Inspection Apparatus 6

Herein, the process (i.e., the defect inspection process and the defect repair process) performed by the defect inspection apparatus 6 will be discussed. Since the operation flow performed by the defect inspection apparatus 6 is almost the same as that performed by the defect inspection apparatus 3 of the first preferred embodiment (see FIG. 8), process steps different from those in the first preferred embodiment will be discussed below with reference to FIG. 8.

First, the CAD data acquisition part 61 acquires the input CAD data D1 from the CAD device 1 and the run-length data acquisition part 62 acquires the run-length data D2 from the RIP device 2 (see Steps S11 to S12).

Subsequently, the defect detection part 63 detects any defect in the run-length data D2 acquired in the preceding step (see Step S12) (see Steps S13 to S16).

Specifically, first, the conversion part 631 acquires the comparison CAD data H1 and the comparison run-length data H2 whose data formats are made comparable (see Step S13). More specifically, the comparison input CAD data acquisition part 6311 performs the coordinating process on the input CAD data D1 (i.e., data acquired by the CAD data acquisition part 61 in the preceding step (see Step S11)) to acquire the coordinated CAD data D11 obtained by performing this process as the comparison CAD data H1. The comparison run-length data acquisition part 6312 acquires the run-length data D2 (i.e., data acquired by the run-length data acquisition part 62 in the preceding step (see Step S12)) as the comparison run-length data H2.

Subsequently, the difference area specification part 632 compares each of the runs Li (i=1, 2 . . . ) included in the comparison run-length data H2 with the corresponding one of the coordinate-value pairs Mi (i=1, 2 . . . ) included in the comparison CAD data H1 to acquire the difference area data D3 specifying the difference area (the excess defect area Ae and the lack defect area Af) between these data (see Steps S15 and S16) (the operations which correspond to those in Steps S14 to S16).

Subsequently, the defect repair part 64 judges if the defect detection part 63 detects any defect in the run-length data D2 (in other words, if any difference area is detected) on the basis of the difference area data D3 acquired in the preceding step (see Step S17).

If it is judged that some defect is detected, the defect repair part 64 repairs the detected defect to acquire the repaired run-length data D4 (see Step S18) and the drawing run-length data acquisition part 65 acquires the repaired run-length data D4 which is thus acquired as the drawing run-length data T (see Step S19). Then, the drawing run-length data transmitting part 66 transmits the acquired drawing run-length data T to the drawing apparatus 4 (see Step S21).

On the other hand, if it is judged that no defect is detected, the drawing run-length data acquisition part 65 acquires the run-length data D2 which is acquired in the preceding step (see Step S12) as the drawing run-length data T (see Step S20). Then, the drawing run-length data transmitting part 66 transmits the acquired drawing run-length data T to the drawing apparatus 4 (see Step S21).

3. Effects

In the above-discussed preferred embodiment, the comparison input CAD data acquisition part 6311 performs the "coordinating process" on the input CAD data D1 to convert this data into the data (coordinated CAD data D11) described by a set of coordinate values (specifically, a set of coordinate-value pairs each consisting of the starting point coordinate value and the end point coordinate value). By comparing the coordinated CAD data D11 with the run-length data D2 (described by a set of line segments), it is possible to specify a defect area existing in the run-length data D2.

The RIP process refers to a process for acquiring a set of line segments from a polygon. In the RIP process, there is a possibility of causing errors in a process for converting the information on the lengths into a set of line segments or allowing some range of interpretation depending on parameters such as resolution and the like, and this causes some defects in the run-length data D2. On the other hand, since the coordinating process is a process for acquiring a set of coordinate values from a polygon, there is no possibility of causing any defect in the coordinated CAD data D11 obtained by performing the coordinating process. Therefore, by comparing the coordinated CAD data D11 with the run-length data D2, it is possible to detect any defect in the run-length data D2 with reliability.

The First Variation

In the defect detection part 33 of the above-discussed first preferred embodiment, the excess defect area specification part 333 and the lack defect area specification part 334 obtain a logical product of the difference area data D3 and the comparison run-length data F2 and a logical product of the difference area data D3 and the comparison CAD data F1 by computation to acquire the excess defect area data D3a and the lack defect area data D3b specifying the excess defect area Ae and the lack defect area Af, respectively (see FIGS. 3 and 4). The excess defect area data D3a and the lack defect area data D3b, however, may be acquired in the following manner.

A defect detection part 8 of the first variation comprises a conversion part 81, a first differential area specification part 82, an excess defect area specification part 83, a second differential area specification part 84 and a lack defect area specification part 85, as shown in FIG. 18. The conversion part 81 is the same as the conversion part 331 of the first preferred embodiment.

As shown in FIG. 19A, the first differential area specification part 82 subtracts a figure area defined by the comparison CAD data F1 (i.e., input CAD data D1) from a figure area defined by the comparison run-length data F2 (i.e., figured run-length data D22) (F2−F1), to acquire first differential area data Ka. In the first differential area data Ka, the value of an area which exists in the comparison run-length data F2 and does not exist in the comparison CAD data F1 is "positive" (positive area S1). Further, the value of an area which does not exist in the comparison run-length data F2 and exists in the comparison CAD data F1 is "negative" (negative area S2), and the value of an area which exists both in the comparison CAD data F1 and the comparison run-length data F2 is "0".

As shown in FIG. 19A, the excess defect area specification part 83 extracts the area of positive value in the first differential area data Ka to acquire the excess defect area data D3a specifying the excess defect area Ae.

As shown in FIG. 19B, the second differential area specification part 84 subtracts a figure area defined by the comparison run-length data F2 (i.e., the figured run-length data D22) from a figure area defined by the comparison CAD data F1 (i.e., the input CAD data D1) (F1−F2), to acquire second differential area data Kb. In the second differential area data Kb, the value of an area which exists in the comparison CAD data F1 and does not exist in the comparison run-length data F2 is "positive" (positive area S1). Further, the value of an area which does not exist in the comparison CAD data F1 and exists in the comparison run-length data F2 is "negative" (negative area S2), and the value of an area which exists both in the comparison CAD data F1 and the comparison run-length data F2 is "0".

As shown in FIG. 19B, the lack defect area specification part 85 extracts the area of positive value in the second differential area data Kb to acquire the lack defect area data D3b specifying the lack defect area Af.

In the first variation, a process operation for detecting defects is performed as follows (the operations which correspond to those in Steps S13 to S16 in FIG. 8).

In other words, the conversion part 81 acquires the input CAD data D1 as the comparison CAD data F1 and the figured run-length data D22 as the comparison run-length data F2.

Next, the first differential area specification part 82 subtracts the figure area defined by the comparison CAD data F1 from the figure area defined by the comparison run-length data F2 to acquire the first differential area data Ka.

Subsequently, the excess defect area specification part 83 extracts the area of positive value in the first differential area data Ka to acquire the excess defect area data D3*a* specifying the excess defect area Ae.

Next, the second differential area specification part 84 subtracts the figure area defined by the comparison run-length data F2 from the figure area defined by the comparison CAD data F1 to acquire the second differential area data Kb.

Subsequently, the lack defect area specification part 85 extracts the area of positive value in the second differential area data Kb to acquire the lack defect area data D3*b* specifying the lack defect area Af.

Any one of the process for acquiring the lack defect area data D3*b* and the process for acquiring the excess defect area data D3*a* may be performed first.

In the above-discussed first variation, by obtaining the difference, not by computing the logical product of two data, it is possible to specify the excess defect area and the lack defect area. Further, it is possible to acquire the excess defect area data D3*a* and the lack defect area data D3*b* on the basis of the difference between the comparison CAD data F1 and the comparison run-length data F2. Therefore, it is not necessary to generate the difference area data D3 unlike the first preferred embodiment.

Though the second differential area data Kb is acquired and the area of positive value in the second differential area data Kb is extracted to specify the lack defect area Af in the above-discussed first variation, the lack defect area Af may be specified by extracting the area of negative value in the first differential area data Ka. Further, though the first differential area data Ka is acquired and the area of positive value in the first differential area data Ka is extracted to acquire the excess defect area Ae in the first variation, the excess defect area Ae may be specified by extracting the area of negative value in the second differential area data Kb. In other words, the excess defect area Ae and the lack defect area Af may be specified by acquiring either one of the first differential area data Ka and the second differential area data Kb and extracting the area of positive value and the area of negative area in the acquired data.

The Second Variation

The excess defect area data D3*a* and the lack defect area data D3*b* may be acquired in the following manner. A defect detection part 9 of the second variation comprises a conversion part 91, a difference area specification part 92, a first difference differential area specification part 93, an excess defect area specification part 94, a second difference differential area specification part 95 and a lack defect area specification part 96, as shown in FIG. 20. The conversion part 91 and the difference area specification part 92 are the same as the conversion part 331 and the difference area specification part 332 of the first preferred embodiment.

As shown in FIG. 21A, the first difference differential area specification part 93 subtracts a figure area defined by the comparison CAD data F1 (i.e., input CAD data D1) from a figure area defined by the difference area data D3 (D3−F1), to acquire first difference differential area data La. In the first difference differential area data La, the value of an area which exists in the difference area data D3 and does not exist in the comparison CAD data F1 is "positive" (positive area S1). Further, the value of an area which does not exist in the difference area data D3 and exists in the comparison CAD data F1 is "negative" (negative area S2), and the value of an area which exists both in the difference area data D3 and the comparison CAD data F1 is "0".

As shown in FIG. 21A, the excess defect area specification part 94 extracts the area of positive value in the first difference differential area data La to acquire the excess defect area data D3*a* specifying the excess defect area Ae.

As shown in FIG. 21B, the second difference differential area specification part 95 subtracts a figure area defined by the comparison run-length data F2 (i.e., the figured run-length data D22) from a figure area defined by the difference area data D3 (D3−F2), to acquire second difference differential area data Lb. In the second difference differential area data Lb, the value of an area which exists in the difference area data D3 and does not exist in the comparison run-length data F2 is "positive" (positive area S1). Further, the value of an area which does not exist in the difference area data D3 and exists in the comparison run-length data F2 is "negative" (negative area S2), and the value of an area which exists both in the difference area data D3 and the comparison run-length data F2 is "0".

As shown in FIG. 21B, the lack defect area specification part 96 extracts the area of positive value in the second difference differential area data Lb to acquire the lack defect area data D3*b* specifying the lack defect area Af.

In the second variation, a process operation for detecting defects is performed as follows (the operations which correspond to those in Steps S13 to S16 in FIG. 8).

In other words, the conversion part 91 acquires the input CAD data D1 as the comparison CAD data F1 and the figured run-length data D22 as the comparison run-length data F2.

Subsequently, the difference area specification part 92 obtains an exclusive OR of the comparison CAD data F1 and the comparison run-length data F2 by computation to acquire the difference area data D3 specifying the difference area between these data.

Next, the first difference differential area specification part 93 subtracts the figure area defined by the comparison CAD data F1 from the figure area defined by the difference area data D3 to acquire the first difference differential area data La.

Subsequently, the excess defect area specification part 94 extracts the area of positive value in the first difference differential area data La to acquire the excess defect area data D3*a* specifying the excess defect area Ae.

Next, the second difference differential area specification part 95 subtracts the figure area defined by the comparison run-length data F2 from the figure area defined by the difference area data D3 to acquire the second difference differential area data Lb.

Subsequently, the lack defect area specification part 96 extracts the area of positive value in the second difference differential area data Lb to acquire the lack defect area data D3*b* specifying the lack defect area Af.

Any one of the process for acquiring the lack defect area data D3*b* and the process for acquiring the excess defect area data D3*a* may be performed first.

In the above-discussed second variation, by obtaining the difference, not by computing the logical product of two data, it is possible to specify the excess defect area and the lack defect area.

Other Variations

Though the defect inspection apparatuses 3, 5 and 6 are each independent of the drawing apparatus 4 in the above-discussed preferred embodiments, the functional structure of the defect inspection apparatuses 3, 5 and 6 (see FIGS. 3 and 9) may be implemented in the drawing apparatus 4. In other words, the drawing apparatus 4 may be united with the defect inspection apparatus 3 (or the defect inspection apparatus 5 or 6).

FIG. 22 is a schematic diagram showing a structure of a drawing apparatus 7 in accordance with this variation. As shown in FIG. 22, the drawing apparatus 7 comprises a functional part (drawing processing part 71) for drawing a figure onto an output medium, and the functions of the constituent parts included in the defect inspection apparatus 3 (or defect inspection apparatus 5 or 6) (i.e., the CAD data acquisition part 31 (51, 61), the run-length data acquisition part 32 (52, 62), the defect detection part 33 (53, 63), the defect repair part 34 (54, 64) and the drawing run-length data acquisition part 35 (55, 65)) are implemented by the hardware included in the drawing apparatus 7. In this case, the drawing processing part 71 acquires the drawing run-length data T obtained by the drawing run-length data acquisition part 35 (55, 65) and performs a drawing process on the basis of the acquired drawing run-length data T.

Though the lack defect area Af in the run-length data D2 is repaired by performing the RIP process again on this area to generate run data (Step S26 in FIG. 8) in the above-discussed preferred embodiments, new run data may be generated directly in the lack defect area Af, not by performing the RIP process. For example, run data existing near the defect area may be forcefully elongated to generate run-length data in the lack defect area Af.

Further, the defect area may be repaired by receiving operator's input manipulation. For example, a screen informing the operator that there should be a defect area (e.g., a screen giving the whole run-length data D2 in which the excess defect area Ae in the run-length data D2 is indicated in red and the lack defect area Af is indicated in blue) is displayed on the display part 16, and an input of instruction to generate or delete run data on each defect area is received from the operator. Then, the defect area may be repaired in accordance with the input of instruction.

Though the data describing a figure to be drawn is CAD data in the above-discussed preferred embodiments, it may be a document file for images or text documents. In this case, the run-length data D2 is data acquired by performing the RIP process on the document file.

Though the figure to be drawn is a circuit pattern in the above-discussed preferred embodiments, the figure to be drawn may not be a circuit pattern.

Though the defect inspection apparatus 3 (5, 6) acquires the input CAD data D1 and the run-length data D2 from the CAD device 1 and the RIP device 2, respectively, which are connected therewith via the network N in the above-discussed preferred embodiments, the way to acquire these data is not limited to this. For example, the defect inspection apparatus 3 (5, 6) may acquire these data by reading these data out from the recording medium M which stores them therein.

Though the apparatus (the drawing apparatus 4) for performing a drawing process on the basis of the drawing run-length data T is a direct drawing apparatus which draws a circuit pattern onto substrates in the above-discussed preferred embodiments, the apparatus for performing the drawing process is not limited to this direct drawing apparatus but may be any one of various apparatuses which adopt the drawing system for drawing a figure onto an output medium on the basis of the run-length data. For example, the apparatus may be a printer for drawing a figure onto a recording medium such as paper or the like on the basis of the run-length data.

Though the functional parts in the defect inspection apparatuses 3, 5 and 6 are implemented by executing a predetermined program P with a computer in the above-discussed preferred embodiments, the functional parts may be implemented by dedicated hardware.

While the invention has been shown and described in detail, the foregoing description is in all aspects illustrative and not restrictive. It is therefore understood that numerous modifications and variations can be devised without departing from the scope of the invention.

What is claimed is:

1. A defect inspection apparatus configured for inspecting a defect in run-length data to be used for drawing of a figure, comprising:
    an input data acquisition part configured for acquiring input data describing a figure to be drawn;
    a run-length data acquisition part configured for acquiring said run-length data by performing a raster imaging processing (RIP) process on said input data; and
    a defect detection part configured for comparing said input data with said run-length data to detect a difference area as a defect area in said run-length data when it is found;
    wherein said defect detection part comprises
    a data format conversion part configured for performing a predetermined conversion process on at least one of said input data and said run-length data to make the data formats of both data comparable, and
    wherein the defect inspection apparatus further comprises a repair part configured for repairing said defect area to acquire repaired run-length data when the defect area is detected in said run-length data.

2. The defect inspection apparatus according to claim 1, wherein
    said data format conversion part comprises
    a part configured for performing a figuring conversion process on said run-length data to acquire figured run-length data which is obtained by converting said run-length data into a data format described by a figure, and
    said defect detection part comprises
    a difference area specification part configured for acquiring difference area data specifying said difference area by computing an exclusive OR operation of said figured run-length data and said input data.

3. The defect inspection apparatus according to claim 2, wherein
    said defect detection part comprises
    an excess defect area specification part for specifying an excess defect area in which run data is generated in said run-length data though no corresponding area exists in said input data by computing a logical product of said difference area data and said figured run-length data.

4. The defect inspection apparatus according to claim 3, further comprising
    an excess defect repair part configured for deleting run data generated in said excess defect area in said run-length data when said excess defect area is specified.

5. The defect inspection apparatus according to claim 2, wherein
    said defect detection part comprises
    a lack defect area specification part for specifying a lack defect area in which no run data is generated in said run-length data though an area exists in said input data by computing a logical product of said difference area data and said input data.

6. The defect inspection apparatus according to claim 5, further comprising
    a lack defect repair part configured for generating new run data in said lack defect area in said run-length data when said lack defect area is specified.

7. The defect inspection apparatus according to claim 2, wherein
    said defect detection part comprises
    a first difference differential area acquisition part for acquiring first difference differential area data by subtracting a figure area defined by said input data from a figure area defined by said difference area data; and
    an excess defect area specification part for specifying an excess defect area in which run data is generated in said run-length data though no corresponding area exists in said input data by extracting an area of positive value in said first difference differential area data.

8. The defect inspection apparatus according to claim 2, wherein
said defect detection part comprises
a second difference differential area acquisition part for acquiring second difference differential area data by subtracting a figure area defined by said figured run-length data from a figure area defined by said difference area data; and
a lack defect area specification part for specifying a lack defect area in which no run data is generated in said run-length data though an area exists in said input data by extracting an area of positive value in said second difference differential area data.

9. The defect inspection apparatus according to claim 1, wherein
said data format conversion part comprises
a part configured for performing a figuring conversion process on said run-length data to acquire figured run-length data which is obtained by converting said run-length data into a data format described by a figure, and
said defect detection part comprises
a first differential area acquisition part configured for acquiring first differential area data by subtracting a figure area defined by said input data from a figure area defined by said figured run-length data; and
an excess defect area specification part configured for specifying an excess defect area in which run data is generated in said run-length data though no corresponding area exists in said input data by extracting an area of positive value in said first differential area data.

10. The defect inspection apparatus according to claim 1, wherein
said data format conversion part comprises
a part configured for performing a figuring conversion process on said run-length data to acquire figured run-length data which is obtained by converting said run-length data into a data format described by a figure, and
said defect detection part comprises
a second differential area acquisition part configured for acquiring second differential area data by subtracting a figure area defined by said figured run-length data from a figure area defined by said input data; and
a lack defect area specification part configured for specifying a lack defect area in which no run data is generated in said run-length data though an area exists in said input data by extracting an area of positive value in said second differential area data.

11. The defect inspection apparatus according to claim 1, wherein
said data format conversion part comprises
a run-length data imaging part configured for performing a first imaging process on said run-length data to acquire imaged run-length data which is obtained by imaging said run-length data; and
an input data imaging part configured for performing a second imaging process on said input data to acquire imaged input data which is obtained by imaging said input data, and
said defect detection part comprises
a difference area specification part configured for specifying said difference area by comparing said imaged run-length data with said imaged input data by pixels.

12. The defect inspection apparatus according to claim 11, wherein
said difference area specification part comprises
a pixel comparison excess defect area specification part for comparing said imaged run-length data with said imaged input data by pixels to specify an area in which a pixel exists only in said imaged run-length data as an excess defect area in which run data is generated in said run-length data though no corresponding area exists in said input data.

13. The defect inspection apparatus according to claim 11, wherein
said difference area specification part comprises
a pixel comparison lack defect area specification part for comparing said imaged run-length data with said imaged input data by pixels to specify an area in which a pixel exists only in said imaged input data as a lack defect area in which no run data is generated in said run-length data though an area exists in said input data.

14. The defect inspection apparatus according to claim 1, wherein
said data format conversion part comprises
an input data coordinating part configured for performing a coordinating process on said input data to acquire coordinated input data described by a set of respective coordinate values of one or more figures included in said input data, and
said defect detection part comprises
a difference area specification part configured for specifying an excess defect area in which run data is generated in said run-length data though no corresponding area exists in said input data and a lack defect area in which no run data is generated in said run-length data though an area exists in said input data by comparing positions of starting points and end points of a plurality of runs included in said run-length data with a predetermined coordinate value among a plurality of coordinate values included in said coordinated input data.

15. The defect inspection apparatus according to claim 1, wherein said input data is computer aided design (CAD) data of a pattern to be drawn onto a substrate, and said run-length data is used for drawing of said pattern onto the substrate.

16. A computer-readable recording medium configured for storing a program which is stored in a computer and executed by said computer to cause said computer to function as a defect inspection apparatus for inspecting a defect in run-length data to be used for drawing of a figure,
wherein said defect inspection apparatus comprises
an input data acquisition part configured for acquiring input data describing a figure to be drawn;
a run-length data acquisition part configured for acquiring run-length data by performing a raster image processing (RIP) process on said input data; and
a defect detection part configured for comparing said input data with said run-length data to detect a difference area as a defect area in said run-length data when it is found;
wherein said defect detection part comprises
a data format conversion part configured for performing a predetermined conversion process on at least one of said input data and said run-length data to make the data formats of both data comparable, and
wherein the defect inspection apparatus further comprises a repair part configured for repairing said defect area to acquire repaired run-length data when the defect area is detected in said run-length data.

17. A figure drawing apparatus configured for drawing a figure onto an output medium on the basis of run-length data, comprising:
an input data acquisition part configured for acquiring input data describing a figure to be drawn;
a run-length data acquisition part configured for acquiring said run-length data by performing a raster image processing (RIP) process on said input data;

a defect detection part configured for comparing said input data with said run-length data to detect a difference area as a defect area in said run-length data when it is found;

wherein said defect detection part comprises a data format conversion part configured for performing a predetermined conversion process on at least one of said input data and said run-length data to make the data formats of both data comparable;

a repair part configured for repairing said defect area to acquire repaired run-length data when the defect area is detected in said run-length data;

a drawing run-length data acquisition part configured for acquiring said repaired run-length data as drawing run-length data when said defect area is detected in said run-length data and acquiring said run-length data as drawing run-length data when said defect area is not detected in said run-length data; and a drawing part configured for drawing a figure onto said output medium on the basis of said drawing run-length data.

18. A figure drawing system configured for drawing a figure onto an output medium on the basis of run-length data, comprising:

a defect inspection apparatus configured for inspecting a defect in said run-length data; and a drawing apparatus configured for acquiring drawing run-length data from said defect inspection apparatus and drawing a figure onto said output medium on the basis of said drawing run-length data, wherein said defect inspection apparatus comprises an input data acquisition part configured for acquiring input data describing a figure to be drawn;

a run-length data acquisition part configured for acquiring said run-length data by performing a raster imaging processing (RIP) process on said input data;

a defect detection part configured for comparing said input data with said run-length data to detect a difference area as a defect area in said run-length data when it is found;

wherein said defect detection part comprises a data format conversion part configured for performing a predetermined conversion process on at least one of said input data and said run-length data to make the data formats of both data comparable a repair part configured for repairing said defect area to acquire repaired run-length data when the defect area is detected in said run-length data;

a drawing run-length data acquisition part configured for acquiring said repaired run-length data as drawing run-length data when said defect area is detected in said run-length data and acquiring said run-length data as drawing run-length data when said defect area is not detected in said run-length data; and a drawing run-length data transmitting part configured for transmitting said drawing run-length data to said drawing apparatus.

* * * * *